United States Patent
Wu et al.

(10) Patent No.: US 8,090,326 B1
(45) Date of Patent: Jan. 3, 2012

(54) COMMUNICATION SIGNAL TRANSMISSION METHOD, DEVICE, AND SYSTEM

(75) Inventors: Wangjun Wu, Shanghai (CN); Yulin Li, Shanghai (CN); Fengqing Yan, Shanghai (CN); Xiaodong Zhang, Shanghai (CN); Xiwen Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/101,866

(22) Filed: May 5, 2011

Related U.S. Application Data

(63) Continuation of application No. PCT/CN2011/070347, filed on Jan. 18, 2011.

(30) Foreign Application Priority Data

Dec. 13, 2010 (CN) .......................... 2010 1 0586186

(51) Int. Cl.
  *H04B 1/16* (2006.01)
(52) U.S. Cl. ...................... 455/73; 455/553.1
(58) Field of Classification Search ................ 455/73, 455/76, 86, 550.1, 552.1, 553.1, 313, 314, 455/315; 375/295, 377
  See application file for complete search history.

(56) References Cited

U.S. PATENT DOCUMENTS

| | | | |
|---|---|---|---|
| 7,573,398 B2 | 8/2009 | Hoctor et al. | |
| 7,729,724 B2 * | 6/2010 | Rofougaran et al. | ...... 455/552.1 |
| 7,778,613 B2 | 8/2010 | Seendripu et al. | |
| 2004/0072547 A1 | 4/2004 | Axness et al. | |
| 2005/0119025 A1 * | 6/2005 | Mohindra et al. | ......... 455/552.1 |
| 2006/0256884 A1 | 11/2006 | Tomioka et al. | |
| 2007/0060077 A1 | 3/2007 | Qian | |

* cited by examiner

*Primary Examiner* — Thanh Le
(74) *Attorney, Agent, or Firm* — Slater & Matsil, L.L.P.

(57) ABSTRACT

A method, device, and system for communication signal transmission are provided, which relate to the field of communications, so as to improve reception performance of the network. The method includes: dividing, by a multi-frequency receiver, Radio Frequency (RF) signals by frequency bands received from an antenna to obtain RF signals of different frequency bands; sending a first group of RF signals of a predetermined frequency band to an RF unit so that the RF unit converts the received first group of the RF signals of the predetermined frequency band into first baseband digital signals and sends the first baseband digital signals to a baseband processing unit; and converting a second group of the RF signals of the predetermined frequency band into second baseband digital signals and sending the second baseband digital signals to the baseband processing unit by using a digital baseband interface.

17 Claims, 13 Drawing Sheets

US 8,090,326 B1

COMMUNICATION SIGNAL TRANSMISSION METHOD, DEVICE, AND SYSTEM

This application is a continuation of International Application No. PCT/CN2011/070347, filed on Jan. 18, 2011, which claims priority to Chinese Patent Application No. 201010586186.5, filed on Dec. 13, 2010, both of which are hereby incorporated by reference in their entireties.

TECHNICAL FIELD

The present invention relates to the field of communications, and in particular, to a communication signal transmission method, device, and system.

BACKGROUND

With the increasing application of new wireless standard technologies, such as Wideband Code Division Multiple Access (WCDMA) and Long Term Evolution (LTE), the number of scenarios in which newly added frequency bands and multiple frequencies share a station increases. Meanwhile, with the development of antenna technologies, frequency bands supported by antennas also expand continuously, and currently, a broadband antenna already can support 790 MHz to 960 MHz or 1710 MHz to 2690 MHz. Taking high-frequency bands for example, a dual-polarized antenna of 1710 MHz to 2690 MHz can support transceivers of 1800 MHz, 2100 MHz, 2100 MHz, or more different frequency bands share an antenna at the same time. With increasing requirements on capacity, an operator has to make good use of frequency resources. In addition, station resources are more and more difficult to acquire, and therefore, scenarios in which operators of multiple frequencies share stations will become more and more common in the future. How to make good use of broadband characteristics of the antenna, that is, each antenna can receive signals of multiple frequencies, and the signals are well used to easily upgrade the existing x way Transmitter and 2 way Receiver (xT2R) (where, x=0, 1, . . . ) network to an xT4R network, or even an xT6R or xT8R network, has become a focus of R&D personnel.

In a relevant technical solution in the prior art, as shown in FIG. 1, four single-frequency xT2R modules and two antennas are used to form a dual-frequency 4 way Receiver (4R) module, in which a Tower Mounted Amplifier (TMA) is optional. In order to support dual-frequency 4R, four Radio Frequency (RF) transceiver modules are required, and two antennas are required because 4R of a signal antenna cannot be used in a multiplex manner, thereby resulting in high costs and complex configuration. Signals of multiple frequency bands cannot be extracted from an antenna.

In another technical solution in the prior art, as shown in FIG. 2, four single-frequency xT2R modules are used to form a dual-frequency xT4R module, and four combiner (Com) units are further included, in which a TMA is optional. In order to support dual-frequency 4R, four modules and four Com units are required. In the solution, although the number of the antennas to be used is decreased, four extra external Com units are required, thereby resulting in complex implementation and configuration of the solution.

SUMMARY OF THE INVENTION

Embodiments of the present invention provide a method, device, and system for communication signal transmission, so as to improve reception performance of the network.

To achieve the above purpose, embodiments of the present invention adopt the following technical solutions:

An embodiment of the present invention provides a communication signal transmission method. The method includes receiving, by a multi-frequency receiver, RF signals from an antenna, and dividing the RF signals into RF signals of different frequency bands by the frequency bands. A first group of RF signals of a predetermined frequency band is sent to an RF unit, so that the RF unit converts the received RF signals into first baseband digital signals and sends the first baseband digital signals to a baseband processing unit. A second group of the RF signals of the predetermined frequency band is converted into second baseband digital signals, and the second baseband digital signals are sent to the baseband processing unit.

An embodiment of the present invention provides a communication signal transmission method. A baseband processing unit receives second baseband digital signals of a predetermined frequency band sent by a multi-frequency receiver and first baseband digital signals of the predetermined frequency band sent by an RF unit. Baseband processing is performed on the first baseband digital signals and the second baseband digital signals.

An embodiment of the present invention provides a communication signal transmission method. The method includes receiving, by a multi-frequency receiver, RF signals from an antenna, and dividing the RF signals into RF signals of different frequency bands by the frequency bands. A first group of RF signals of a predetermined frequency band is sent to an RF unit, so that the RF unit converts the received RF signals into first baseband digital signals and sends the first baseband digital signals to a baseband processing unit. A second group of the RF signals of the predetermined frequency band is converted into second baseband digital signals, and sending the second baseband digital signals to the RF unit, so that the RF unit sends the second baseband digital signals to the baseband processing unit.

An embodiment of the present invention provides a multi-frequency receiver. The multi-frequency receiver includes a multi-frequency combiner/divider and multiple receivers, one or more digital baseband interfaces, one or more first RF interfaces connected to an antenna, and one or more second RF interfaces connected to an RF unit, where each frequency band corresponds to multiple receivers. The multi-frequency combiner/divider is configured to distribute RF signals received by the antenna to receivers by the frequency bands. A first group of the receivers of a predetermined frequency band is configured to send RF signals received by such receivers to the RF unit by using a second RF interface, so that the RF unit converts the received RF signals into the first baseband digital signals and sends the first baseband digital signals to a baseband processing unit. A second group of the receivers of the predetermined frequency band is configured to convert RF signals received by such receivers into the second baseband digital signals, and to send the second baseband digital signals to the baseband processing unit by using a digital baseband interface.

An embodiment of the present invention provides a multi-frequency receiver. The multi-frequency receiver includes: a multi-frequency combiner/divider and multiple receivers, one or more digital baseband interfaces, one or more first RF interfaces connected to an antenna, and one or more second RF interfaces connected to an RF unit, where each frequency band corresponds to multiple receivers. The multi-frequency combiner/divider is configured to distribute RF signals received by the antenna to receivers by frequency bands. A first group of the receivers of the predetermined frequency band is configured to send RF signals received by such receivers to the RF unit by using a second RF interface, so that the RF unit converts the received RF signals into the first baseband digital signals and sends the first baseband digital signals to a baseband processing unit. A second group of the receivers of the predetermined frequency band is configured to convert RF signals received by such receivers into the second baseband digital signals, and send the second baseband digital signals to the RF unit by using a digital baseband interface, so that the RF unit sends the second baseband digital signals to the baseband processing unit.

An embodiment of the present invention provides a wireless communication system. The wireless communication system includes a multi-frequency receiver. The multi-frequency receiver includes one or more digital baseband interfaces, one or more first RF interfaces connected to an antenna, and one or more second RF interfaces connected to an RF unit. The multi-frequency receiver is configured to divide RF signals by frequency bands received by using a first RF interface from the antenna to obtain RF signals of different frequency bands; to send a first group of RF signals of a predetermined frequency band to the RF unit by using a first RF interface so that the RF unit converts the received first group of the RF signals of the predetermined frequency band into first baseband digital signals and sends the first baseband digital signals to a baseband processing unit; and to convert the second group of the RF signals of the predetermined frequency band into second baseband digital signals and send the second baseband digital signals to the baseband processing unit by using a digital baseband interface.

An embodiment of the present invention provides a wireless communication system. The wireless communication system includes a multi-frequency receiver. The multi-frequency receiver includes one or more digital baseband interfaces, one or more first RF interfaces connected to an antenna, and one or more second RF interfaces connected to an RF unit. The multi-frequency receiver is configured to divide RF signals by frequency bands received by using a first RF interface from the antenna to obtain RF signals of different frequency bands; to send a first group of RF signals of a predetermined frequency band to the RF unit by using a second RF interface so that the RF unit converts the received first group of the RF signals of the predetermined frequency band into first baseband digital signals and sends the first baseband digital signals to a baseband processing unit; and to convert a second group of the RF signals of the predetermined frequency band into second baseband digital signals and to send the second baseband digital signals to a first RF module by using a digital baseband interface, so that the first RF module sends the second baseband digital signals to the baseband processing unit.

In the technical solutions according to embodiments of the present invention, a multi-frequency receiver divides RF signals by frequency bands received from an antenna to obtain RF signals of different frequency bands; sends a first group of RF signals of a predetermined frequency band to an RF unit so that the RF unit converts the received first group of the RF signals of the predetermined frequency band into first baseband digital signals and sends the first baseband digital signals to a baseband processing unit; and converts a second group of the RF signals of the predetermined frequency band into second baseband digital signals and sends the second baseband digital signals to the baseband processing unit by using a digital baseband interface. Alternatively, the multi-frequency receiver sends the first group of the RF signals of the predetermined frequency band to the RF unit, so that the RF unit converts the received first group of the RF signals of the predetermined frequency band into the first baseband digital signals and sends the first baseband digital signals to a baseband processing unit; and converts the second group of the RF signals of the predetermined frequency band into the second baseband digital signals and sends the second baseband digital signals to a first RF module by using a digital baseband interface, so that the first RF module sends the second baseband digital signals to the baseband processing unit. In this way, the baseband processing unit can receive multiple channels of received signals corresponding to the different frequency bands, and the number of the channels in which a network system receives the RF signals of the different frequency bands is increased, thereby improving reception performance of the network system without adding any antenna. In addition, in the technical solutions according to embodiments of the present invention, the baseband digital signals corresponding to the second group of the RF signals of the predetermined frequency band are sent to the baseband processing unit only by using a digital baseband interface of the multi-frequency receiver, so that multi-reception is achieved in a simple manner.

BRIEF DESCRIPTION OF THE DRAWINGS

To illustrate the technical solutions according to embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF ILLUSTRATIVE EMBODIMENTS

The technical solution of the present invention is clearly and completely described in the following with reference to the accompanying drawings. It is obvious that the embodiments to be described are only a part rather than all of the embodiments of the present invention. Persons having ordinary skill in the art can derive other embodiments from the embodiments provided herein without making any creative effort, and all such embodiments are covered in the protection scope of the present invention.

It should be noted that each of the embodiments of the present invention is applicable to a Frequency Division Duplexing (FDD) system, a Time Division Duplexing (TDD) system, and other systems, such as a hybrid FDD-TDD system.

Embodiment 1

Figure 1:
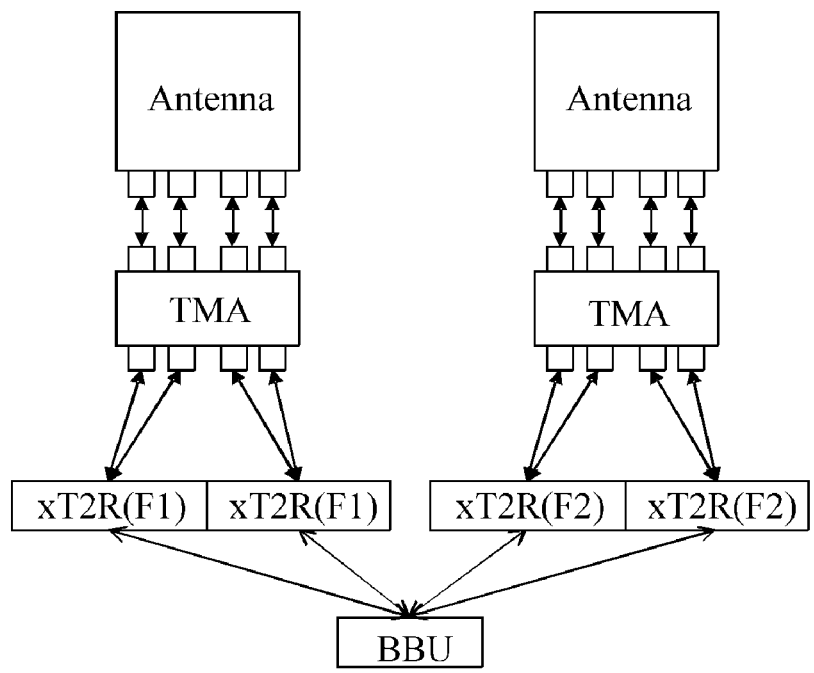
FIG. 1 is a schematic block diagram of a technical solution in the prior art.
Figure 2:
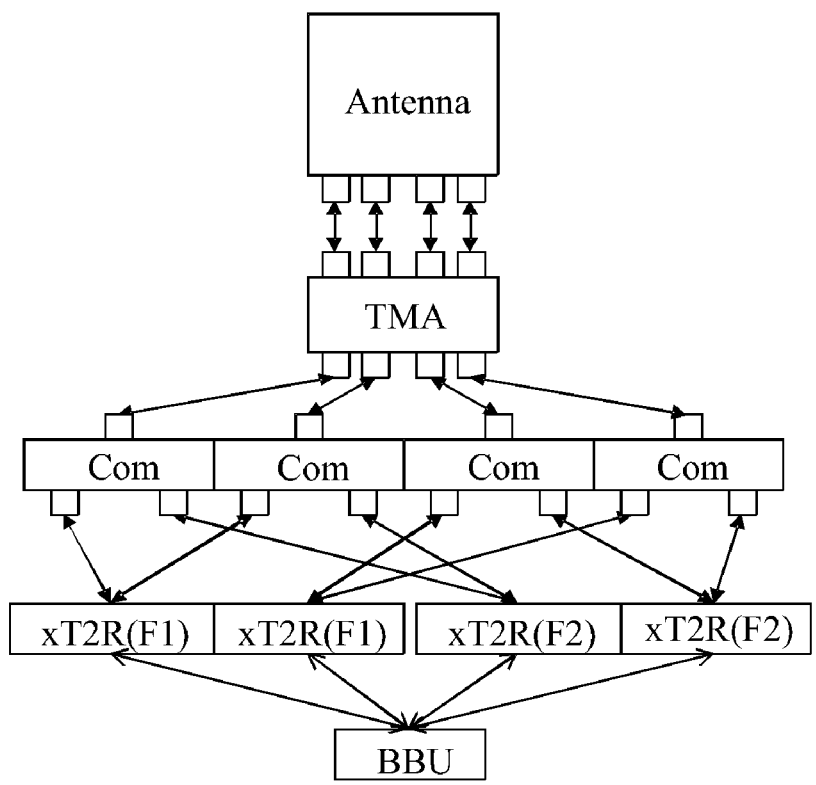
FIG. 2 is a schematic block diagram of another technical solution in the prior art.
Figure 3:
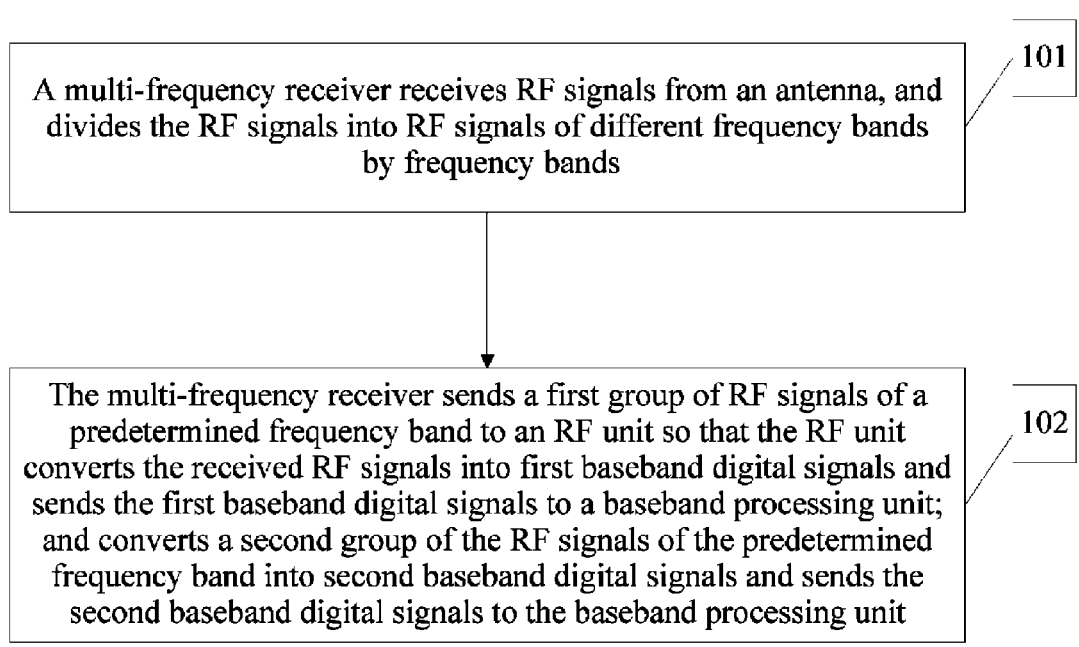
FIG. 3 is a flow chart of a communication signal transmission method of a multi-frequency receiver side according to Embodiment 1 of the present invention.

According to an embodiment of the present invention, a communication signal transmission method is provided, and the method is a method of a multi-frequency receiver side. As shown in FIG. 3, the method includes the following steps.

Step 101: A multi-frequency receiver receives RF signals from an antenna, and divides the RF signals into RF signals of different frequency bands by the frequency bands.

Figure 4:
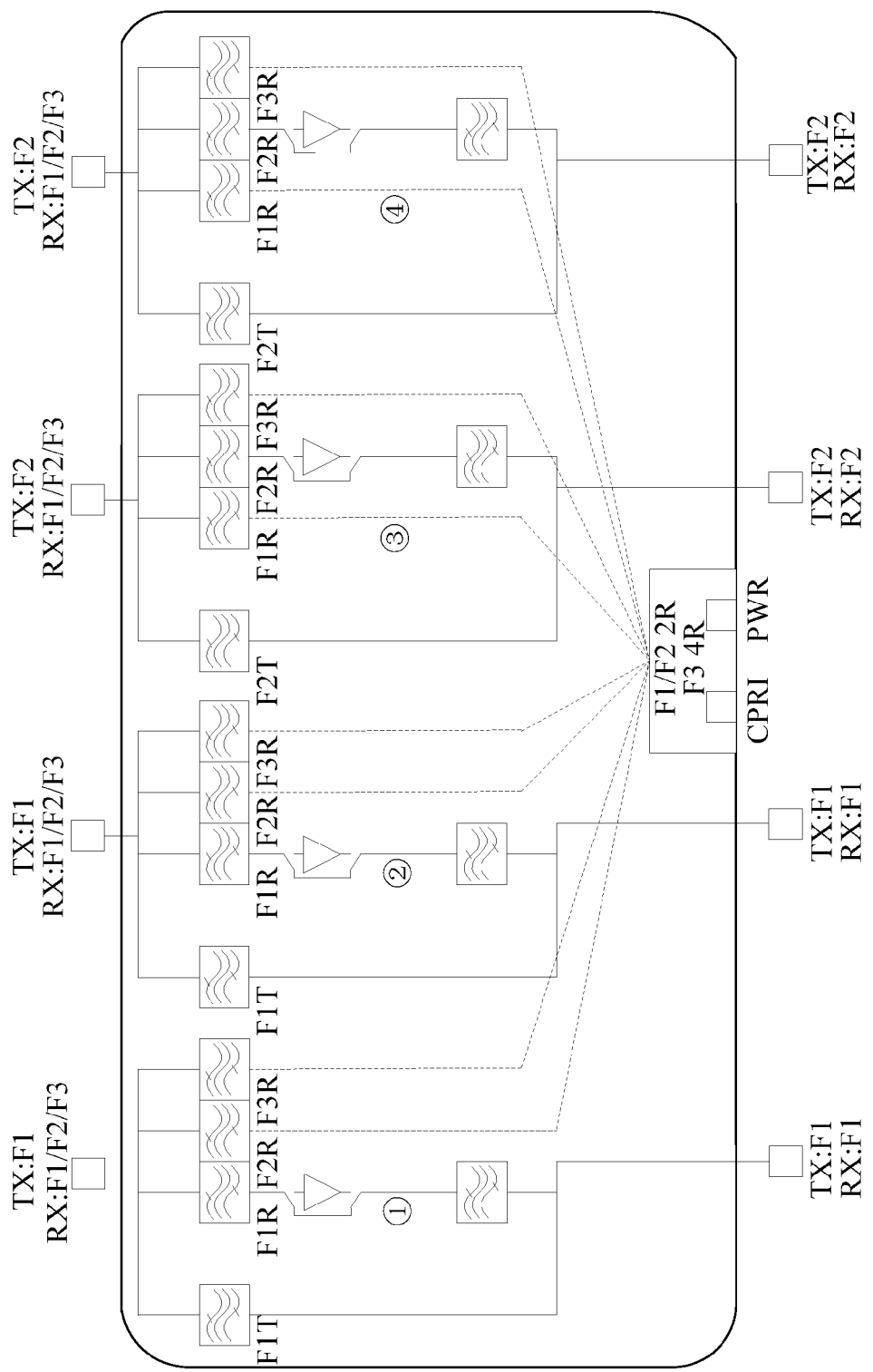
FIG. 4 is a schematic flow chart of the multi-frequency receiver receiving RF signals according to Embodiment 1 of the present invention.

Specifically, the receiving, by the multi-frequency receiver, the RF signals from the antenna, and dividing the RF signals into the RF signals of the different frequency bands includes the following step. As shown in FIG. 4, when the RF signals received by the multi-frequency receiver from the antenna include the RF signals of three frequency bands, the RF signals are divided into the RF signals of the three frequency bands by the frequency bands, which are RF signals of an F1 frequency band, RF signals of an F2 frequency band, and RF signals of an F3 frequency band. In addition, each of the frequency bands corresponds to multiple reception channels for receiving the RF signals of the frequency band. For example, the RF signals of the F1 frequency band are received by four reception channels, which are four F1Rs shown in FIG. 4; the RF signals of the F2 frequency band are received by four reception channels, which are four F2Rs shown in FIG. 4; and the RF signals of the F3 frequency band are received by four reception channels, which are four F3Rs shown in FIG. 4.

Step 102: The multi-frequency receiver sends a first group of RF signals of a predetermined frequency band to an RF unit so that the RF unit converts the received RF signals into first baseband digital signals and sends the first baseband digital signals to a baseband processing unit; and converts a second group of the RF signals of the predetermined frequency band into second baseband digital signals and sends the second baseband digital signals to the baseband processing unit.

The sending the first group of the RF signals of the predetermined frequency band to the RF unit so that the RF unit converts the received RF signals into the first baseband digital signals and sends the first baseband digital signals to the baseband processing unit includes sending a group of the RF signals of a first frequency band to a first RF module, so that the first RF module converts the received RF signals into the first baseband digital signals and sends the first baseband digital signals to the baseband processing unit.

It should be noted that the first frequency band herein generally refers to any frequency band included by the multi-frequency receiver, and is not limited to the frequency band numbered 1, of the frequency bands. For example, as shown in FIG. 4, the first frequency band is preset as the F1 frequency band, and sending a group of the RF signals of the first frequency band to the first RF module so that the first RF module converts the received RF signals into the first baseband digital signals and sends the first baseband digital signals to the baseband processing unit may include sending RF signals received by two reception channels (a reception channel ① and a reception channel ② of the F1 frequency band to the first RF module, so that the first RF module converts the received two RF signals into respective first baseband digital signals of the two RF signals and sends the first baseband digital signals to the baseband processing unit.

The converting the second group of the RF signals of the predetermined frequency band into the second baseband digital signals and sending the second baseband digital signals to the baseband processing unit includes converting remaining RF signals of the first frequency band into the second baseband digital signals, and sending the second baseband digital signals to the baseband processing unit.

For example, as shown in FIG. 4, the converting the remaining RF signals of the F1 frequency band into the second baseband digital signals and sending the second baseband digital signals to the baseband processing unit may include converting RF signals received by two remaining reception channels (a reception channel ③ and a reception channel ④) of the F1 frequency band into respective second baseband digital signals of the two channels, and sending the second baseband digital signals to the baseband processing unit by using a digital baseband interface. PWR shown in FIG. 4 represents a power interface.

Figure 20:
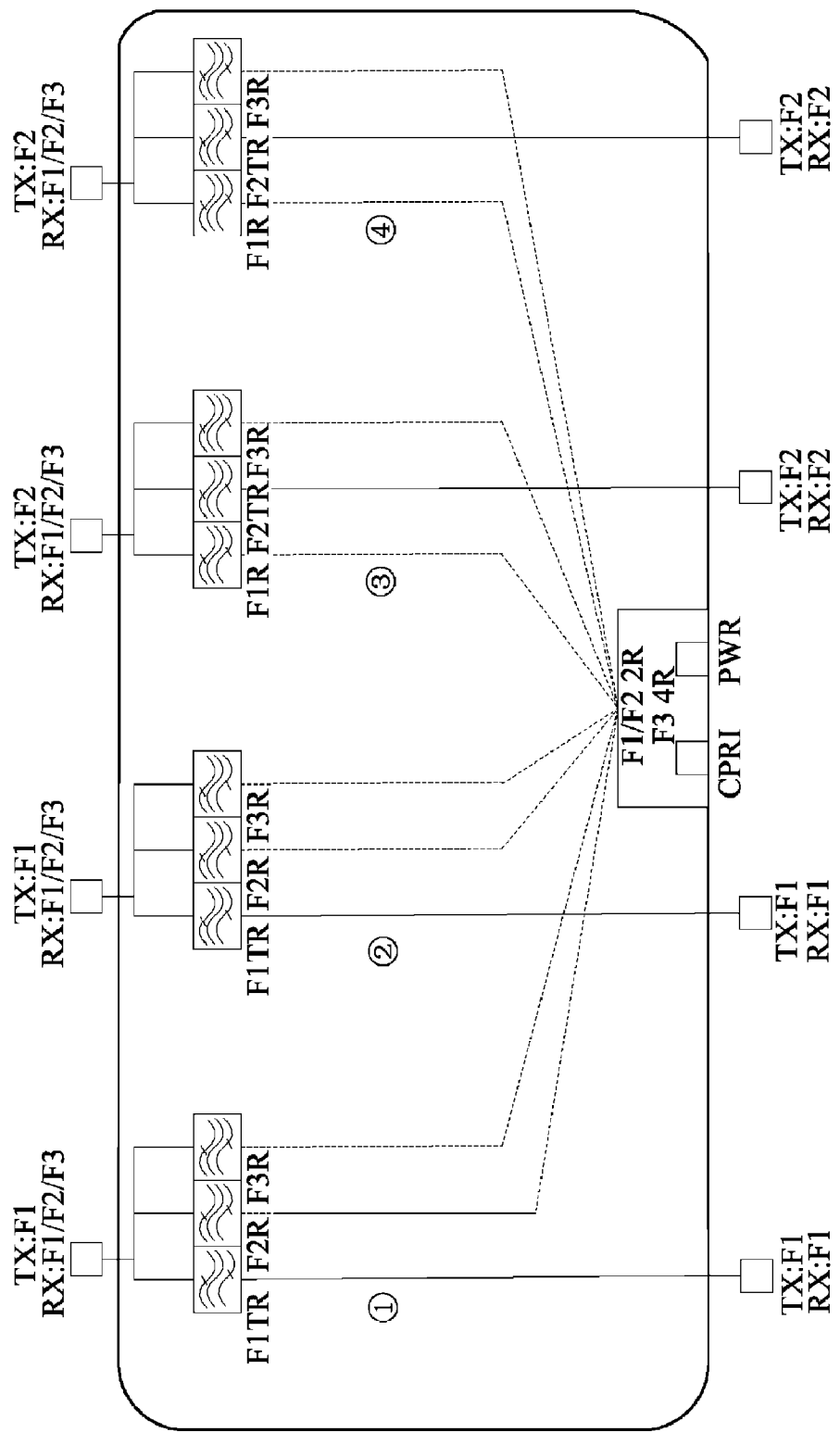
FIG. 20 is another schematic flow chart of the multi-frequency receiver receiving RF signals according to Embodiment 1 of the present invention.

It should be understood that FIG. 4 is a schematic flow chart of a multi-frequency receiver in an FDD system receiving RF signals; and FIG. 20 illustrates the flow of a multi-frequency receiver in a TDD system receiving RF signals. The difference between FIG. 20 and FIG. 4 is that in FIG. 4, a reception channel and a transmission channel of the same frequency band in a receiver correspond to different physical channels, but in FIG. 20, a reception channel a transmission channel of the same frequency band in a receiver correspond to the same physical channel.

Figure 5:
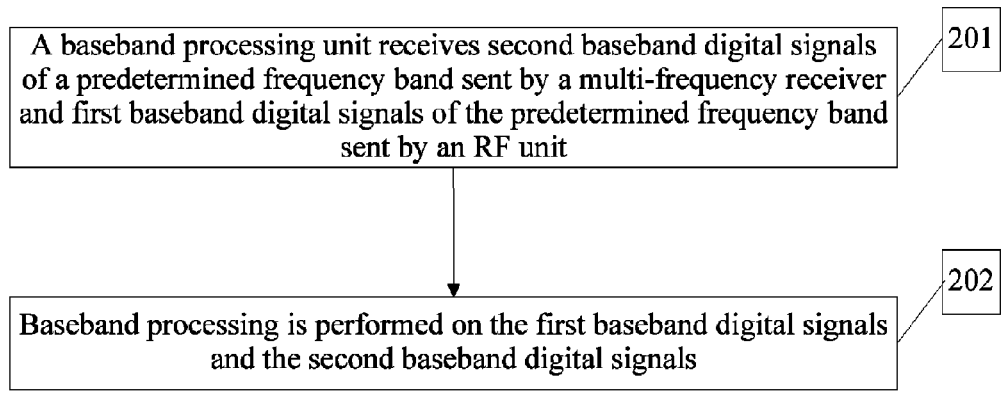
FIG. 5 is a flow chart of a communication signal transmission method of a baseband processing unit side according to Embodiment 1 of the present invention.

According to an embodiment of the present invention, a communication signal transmission method is further provided, and the method is a method of a baseband processing unit side. As shown in FIG. 5, the method includes the following steps.

Step 201: A baseband processing unit receives second baseband digital signals of a predetermined frequency band sent by a multi-frequency receiver and first baseband digital signals of the predetermined frequency band sent by an RF unit.

The second baseband digital signals are obtained by converting a second group of the RF signals of the predetermined frequency band received by the multi-frequency receiver; and the first baseband digital signals are obtained by converting, by the RF unit, a first group of the RF signals of the predetermined frequency band received by the multi-frequency receiver.

For example, corresponding to what is illustrated in FIG. 4, the F1 frequency band is still taken as an example for illustrating. In an embodiment of the present invention, the second baseband digital signals are obtained by converting the RF signals received by the reception channel ③ and the reception channel ④ among the RF signals of the F1 frequency band received by the multi-frequency receiver, and two-channel reception is implemented. The first baseband digital signals are obtained by converting, by the RF unit, the RF signals received by the reception channel ① and the reception channel ② among the RF signals of the F1 frequency band received by the multi-frequency receiver, and two-channel reception is also implemented. Therefore, when the baseband processing unit receives the first baseband digital signals and the second baseband digital signals, four-channel reception on one frequency bands is implemented.

It should be noted that when the multi-frequency receiver performs the preceding operation respectively on the received RF signals of multiple frequency bands, the baseband processing unit accordingly performs multi-channel reception on all of the multiple frequency bands.

Step 202: Baseband processing is performed on the first baseband digital signals and the second baseband digital signals.

The performing of the baseband processing on the first baseband digital signals and the second baseband digital signals may be implemented by using any method in the prior art, and is not limited by the embodiments of the present invention.

In an embodiment of the present invention, the multi-frequency receiver divides the RF signals by frequency bands received from an antenna to obtain the RF signals of the different frequency bands; sends the first group of the RF signals of the predetermined frequency band to the RF unit so that the RF unit converts the received first group of the RF signals of the predetermined frequency band into the first baseband digital signals and sends the first baseband digital signals to the baseband processing unit; and converts the second group of the RF signals of the predetermined frequency band into the second baseband digital signals and sends the second baseband digital signals to the baseband processing unit. In this way, the baseband processing unit can receive multiple channels of received signals corresponding to the different frequency bands, and the number of the channels in which the network system receives the RF signals corresponding to the different frequency bands is increased without adding any antenna, thereby improving reception performance of the network system. In addition, in the technical solution according to an embodiment of the present invention, the baseband digital signals corresponding to the second group of the RF signals of the predetermined frequency band are sent to the baseband processing unit only by using a digital baseband interface of the multi-frequency receiver, so that multi-reception is achieved in a simple manner.

The communication signal transmission method is described in detail with reference to FIG. 4 in the preceding embodiment. Obviously, the method is also applicable to FIG. 20, and specific processing procedures thereof are substantially the same as those in FIG. 4, which are not repeated herein.

Embodiment 2

Figure 6:
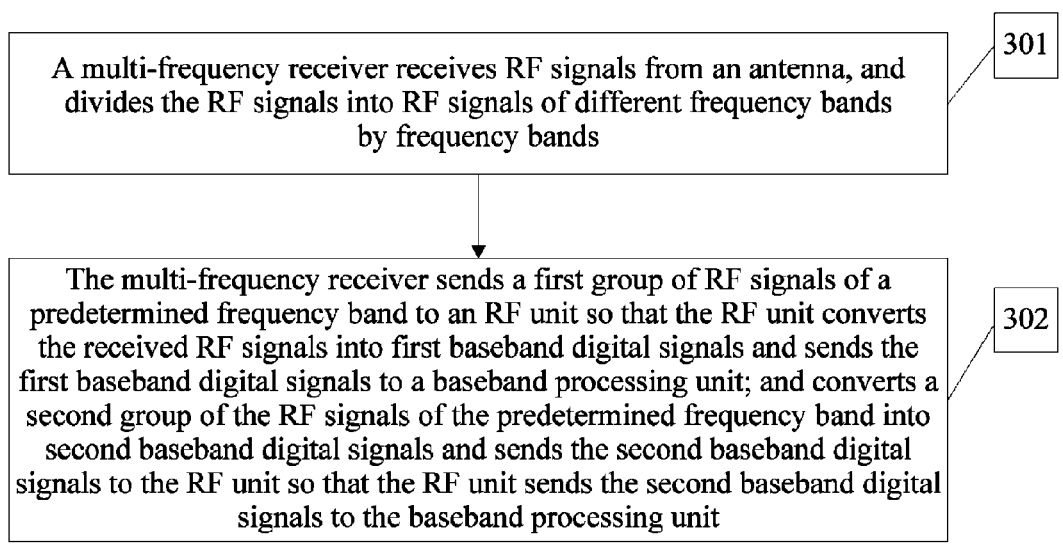
FIG. 6 is a flow chart of a communication signal transmission method of a multi-frequency receiver side according to Embodiment 2 of the present invention.

According to an embodiment of the present invention, a communication signal transmission method is provided, and the method is a method of a multi-frequency receiver side. As shown in FIG. 6, the method includes the following steps:

Step 301: A multi-frequency receiver receives RF signals from an antenna, and divides the RF signals into RF signals of different frequency bands by the frequency bands.

In an embodiment of the present invention, corresponding descriptions in step 101 in Embodiment 1 may be referred to for detailed descriptions of the receiving, by the multi-frequency receiver, the RF signals from the antenna and dividing the RF signals into the RF signals of the different frequency bands. Therefore, the descriptions are not repeated herein in other embodiments of the present invention.

Step 302: The multi-frequency receiver sends a first group of RF signals of a predetermined frequency band to an RF unit so that the RF unit converts the received RF signals into first baseband digital signals and sends the first baseband digital signals to a baseband processing unit; and converts a second group of the RF signals of the predetermined frequency band into second baseband digital signals and sends the second baseband digital signals to the RF unit so that the RF unit sends the second baseband digital signals to the baseband processing unit.

The sending the first group of the RF signals of the predetermined frequency band to the RF unit so that the RF unit converts the received RF signals into the first baseband digital signals and sends the first baseband digital signals to the baseband processing unit includes sending a group of the RF signals of a first frequency band to a first RF module, so that the first RF module converts the received RF signals into the first baseband digital signals and sends the first baseband digital signals to the baseband processing unit. Corresponding descriptions in step 102 in Embodiment 1 may be referred to for detailed descriptions of the sending the first group of the RF signals of the predetermined frequency band to the RF unit. Therefore, the descriptions are not repeated herein in other embodiments of the present invention.

The converting the second group of the RF signals of the predetermined frequency band into the second baseband digital signals and sending the second baseband digital signals to the RF unit so that the RF unit sends the second baseband digital signals to the baseband processing unit includes converting remaining RF signals of the first frequency band into the second baseband digital signals and sending the second baseband digital signals to the first RF module, so that the first RF module sends the second baseband digital signals to the baseband processing unit. Corresponding descriptions in step 102 in Embodiment 1 may be referred to for detailed descriptions of the converting the second group of the RF signals of the predetermined frequency band into the second baseband digital signals and sending the second baseband digital signals to the RF unit so that the RF unit sends the second baseband digital signals to the baseband processing unit. What is different is that the second baseband digital signals are sent to the RF unit, and the RF unit forwards the second baseband digital signals to the baseband processing unit.

Figure 7:
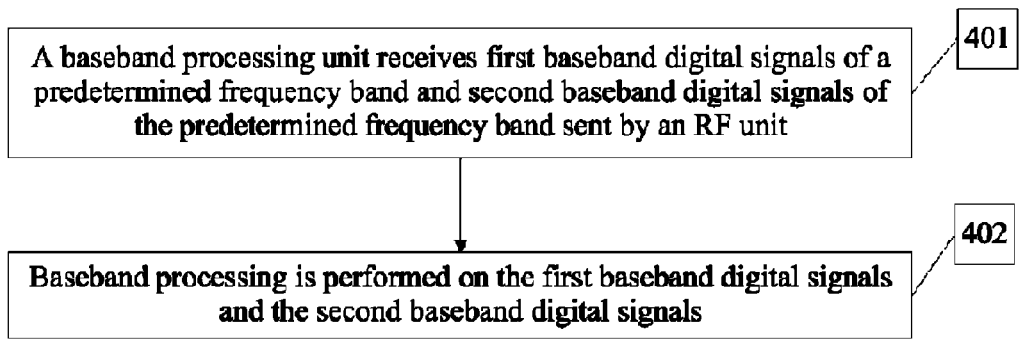
FIG. 7 is a flow chart of a communication signal transmission method of a baseband processing unit side according to Embodiment 2 of the present invention.

According to an embodiment of the present invention, a communication signal transmission method is further provided, and the method is a method of a baseband processing unit side. As shown in FIG. 7, the method includes the following steps.

Step 401: A baseband processing unit receives first baseband digital signals of a predetermined frequency band and second baseband digital signals of the predetermined frequency band sent by an RF unit.

The second baseband digital signals are obtained by converting a second group of RF signals of the predetermined frequency band received by the multi-frequency receiver, and the multi-frequency receiver sends the second baseband digital signals to the RF unit, so that the RF unit sends the second baseband digital signals to the baseband processing unit. The first baseband digital signals are obtained by converting, by the RF unit, a first group of the RF signals of the predetermined frequency band received by the multi-frequency receiver.

Step 402: Baseband processing is performed on the first baseband digital signals and the second baseband digital signals.

The performing the baseband processing on the first baseband digital signals and the second baseband digital signals may be implemented by using any method in the prior art, and is not limited by the embodiments of the present invention.

In an embodiment of the present invention, the multi-frequency receiver divides RF signals by frequency bands received from an antenna to obtain the RF signals of different frequency bands; sends the first group of the RF signals of the predetermined frequency band to the RF unit so that the RF unit converts the received first group of the RF signals of the predetermined frequency band into the first baseband digital signals and sends the first baseband digital signals to the baseband processing unit; and converts the second group of the RF signals of the predetermined frequency band into the second baseband digital signals and sends the second baseband digital signals to the RF unit, to enable the RF unit to forward the second baseband digital signals to the baseband processing unit. In this way, the baseband processing unit can receive multiple channels of received signals corresponding to the different frequency bands, and the number of channels in which the network system receives the RF signals corresponding to the different frequency bands is increased without adding any antenna, thereby improving reception performance of the network system. In addition, in the technical solution according to an embodiment of the present invention, the baseband digital signals corresponding to the second group of the RF signals of the predetermined frequency band are sent to the baseband processing unit only by using a digital baseband interface of the multi-frequency receiver, so that multi-reception is achieved in a simple manner.

Embodiment 3

Figure 8:
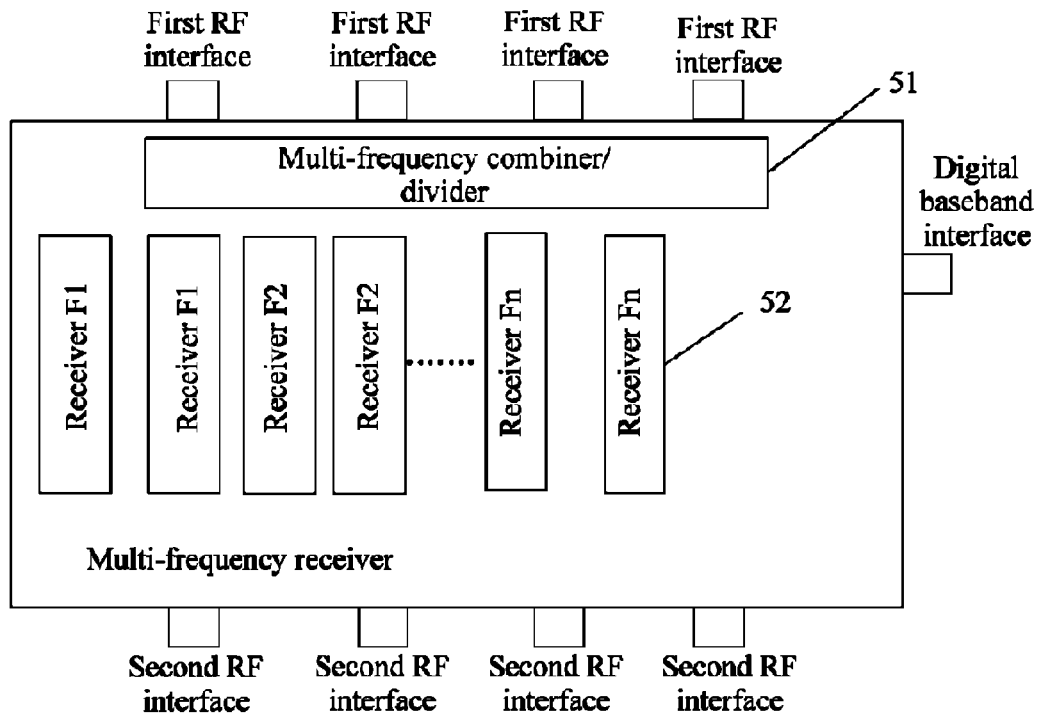
FIG. 8 is a schematic block diagram of a multi-frequency receiver according to Embodiment 3 of the present invention.

According to an embodiment of the present invention, a multi-frequency receiver is provided. As shown in FIG. 8, the multi-frequency receiver includes a multi-frequency combiner/divider 51 and multiple receivers 52. Each frequency band corresponds to multiple receivers 52, one or more digital baseband interfaces, one or more first RF interfaces connected to an antenna, and one or more second RF interfaces connected to an RF unit.

The multi-frequency combiner/divider 51 is configured to distribute RF signals received by the antenna to receivers 52 of a predetermined frequency band by the frequency bands.

A first group of the receivers 52 of the predetermined frequency band is configured to send RF signals received by such receivers to the RF unit by using a second RF interface, so that the RF unit converts the received RF signals into first baseband digital signals and sends the first baseband digital signals to a baseband processing unit. A second group of the receivers 52 of the predetermined frequency band is configured to convert RF signals received by such receivers into second baseband digital signals, and to send the second baseband digital signals to the baseband processing unit by using a digital baseband interface.

When the predetermined frequency band includes a first frequency band and the RF unit includes a first RF module, the first group of the receivers 52 of the predetermined frequency band is configured to send RF signals received by such receivers to the first RF module by using a second RF interface, so that the first RF unit converts the received RF signals into the first baseband digital signals and sends the first baseband digital signals to the baseband processing unit. The second group of the receivers 52 of the predetermined frequency band is configured to convert RF signals received by such receivers into the second baseband digital signals, and to send the second baseband digital signals to the baseband processing unit by using a digital baseband interface. When the first frequency band includes F1, details are as follows.

Referring to FIG. 4, there are four receivers corresponding to the first frequency band F1, and two of the receivers are used as a group of the receivers of the first frequency band. The group of receivers of the first frequency band F1 is configured to send RF signals received by such receivers to the first RF module by using a second RF interface, so that the first RF module converts the received RF signals into the first baseband digital signals and sends the first baseband digital signals to the baseband processing unit. Corresponding descriptions in step 102 in Embodiment 1 may be referred to for details about how the group of the receivers of the first frequency band F1 sends the received RF signals to the first RF module by using a second RF interface. Therefore, the details are not repeated herein in other embodiments of the present invention.

Referring to FIG. 4, there are four receivers corresponding to the first frequency band F1, and the other two of the receivers are used as the remaining receivers of the first frequency band F1. The remaining receivers of the first frequency band F1 are configured to convert RF signals received by such receivers into the second baseband digital signals, and to send the second baseband digital signals to the baseband processing unit by using a digital baseband interface. Corresponding descriptions in step 102 in Embodiment 1 may be referred to for details about how the remaining receivers of the first frequency band F1 converts the received RF signals into the second baseband digital signals and sends the second baseband digital signals to the baseband processing unit by using a digital baseband interface. Therefore, the details are not repeated herein in other embodiments of the present invention.

When the predetermined frequency band includes a first frequency band and a second frequency band, and the RF unit includes a first RF module and a second RF module, the first group of the receivers 52 of the predetermined frequency band is configured to send RF signals received by such receivers to the corresponding RF modules by using the second RF interfaces, so that the corresponding RF modules convert the received RF signals into the first baseband digital signals, and send the first baseband digital signals to the baseband processing unit. The second group of the receivers 52 of the predetermined frequency band is configured to convert RF signals received by such receivers into the second baseband digital signals, and to send the second baseband digital signals to the baseband processing unit by using a digital baseband interface. Details of the respective RF modules of the received RF signals include.

Referring to FIG. 4, there are four receivers corresponding to the first frequency band F1, and two of the receivers are used as a group of the receivers of the first frequency band F1; and the number of the receivers corresponding to the second frequency band F2 is 4, and two of the receivers are used as a group of the receivers of the second frequency band F2. The group of the receivers of the first frequency band F1 and the group of the receivers of the second frequency band F2 are configured to send the respective received RF signals to the respective RF modules by using the respective second RF interfaces, so that the RF modules convert the received RF signals into the first baseband digital signals, and send the first baseband digital signals to the baseband processing unit. Corresponding descriptions in step 102 in Embodiment 1 may be referred to for details about how a group of the receivers of the first frequency band F1 and a group of the receivers of the second frequency band F2 sending the respective received RF signals to the respective RF modules by using the respective second RF interfaces. Therefore, the details are not repeated herein in other embodiments of the present invention.

Referring to FIG. 4, there are four receivers corresponding to the first frequency band F1, and the other two of the receivers are used as the remaining receivers of the first frequency band F1; and there are 4 receivers corresponding to the second frequency band F2, and the other two of the receivers are used as the remaining receivers of the second frequency band F2. The remaining receivers of the first frequency band F1 and the remaining receivers of the second frequency band F2 are configured to convert the respective received RF signals into the second baseband digital signals, and to send the second baseband digital signals to the baseband processing unit by using a digital baseband interface.

When the predetermined frequency band includes a first frequency band, a second frequency band, and a third frequency band, and the RF unit includes a first RF module, a second RF module, and a third RF module, the first group of the receivers 52 of the predetermined frequency band is configured to send RF signals received by such receivers to the RF unit by using a second RF interface, so that the RF unit converts the received RF signals into the first baseband digital signals, and sends the first baseband digital signals to the baseband processing unit. The second group of the receivers 52 of the predetermined frequency band is configured to convert RF signals received by such receivers into the second baseband digital signals, and to send the second baseband digital signals to the baseband processing unit by using a digital baseband interface. When the first frequency band includes F1, the second frequency band includes F2, and the third frequency band includes F3, details are as follows.

Referring to FIG. 4, there are four receivers corresponding to the first frequency band F1, and two of the receivers are used as a group of the receivers of the first frequency band F1; and there are four receivers corresponding to the second frequency band F2, and two of the receivers are used as a group of the receivers of the second frequency band F2. The group of the receivers of the first frequency band F1 and the group of the receivers of the second frequency band F2 are configured to send the respective received RF signals to the respective RF modules by using the respective second RF interfaces, so that the RF modules convert the received RF signals into the first baseband digital signals, and send the first baseband digital signals to the baseband processing unit. Corresponding descriptions in step 102 in Embodiment 1 may be referred to for details about how a group of the receivers of the first frequency band F1 and a group of the receivers of the second frequency band F2 send the respective received RF signals to the respective RF modules by using the respective second RF interfaces. Therefore, the details are not repeated herein in other embodiments of the present invention.

Referring to FIG. 4, there are four receivers corresponding to the first frequency band F1, and the other two of the receivers are used as the remaining receivers of the first frequency band F1; there are four receivers corresponding to the second frequency band F2, and the other two of the receivers are used as the remaining receivers of the second frequency band F2; and there are four receivers corresponding to the third frequency band F3. The remaining receivers of the first frequency band F1, the remaining receivers of the second frequency band F2, and multiple receivers of the third frequency band F3 are configured to convert the respective received RF signals into the second baseband digital signals, and to send the second baseband digital signals to the baseband processing unit by using a digital baseband interface.

In addition, when the multi-frequency combiner/divider 51 is configured in a dividing manner, the number of the second RF interfaces is equal to that of the first RF interfaces; or when the multi-frequency combiner/divider 51 is configured in a combining manner, the number of the second RF interfaces is smaller than the number of the first RF interfaces.

It should be noted that the digital baseband interface may be a Common Public Radio Interface (CPRI), and may also be an Open Base Station Architecture Initiative (OBSAI) interface, which is not limited by the embodiments of the present invention.

In addition, the multi-frequency receiver further includes a TMA (not shown), and the TMA is configured to amplify the RF signals before the RF signals are sent to an air interface by using the multi-frequency receiver and the antenna.

In an embodiment of the present invention, the multi-frequency receiver divides the RF signals by frequency bands received from an antenna to obtain the RF signals of the different frequency bands; sends the first group of the RF signals of the predetermined frequency band to the RF unit so that the RF unit converts the received first group of the RF signals of the predetermined frequency band into the first baseband digital signals and sends the first baseband digital signals to the baseband processing unit; and converts the second group of the RF signals of the predetermined frequency band into the second baseband digital signals and sends the second baseband digital signals to the baseband processing unit. In this way, the baseband processing unit can receive multiple channels of received signals corresponding to the different frequency bands, and the number of channels in which the network system receives the RF signals corresponding to the different frequency bands is increased without adding any antenna, thereby improving reception performance of the network system. In addition, in the technical solution according to an embodiment of the present invention, the baseband digital signals corresponding to the second group of the RF signals of the predetermined frequency band are sent to the baseband processing unit only by using the digital baseband interface of the multi-frequency receiver, so that multi-reception is achieved in a simple manner.

In addition, in an embodiment of the present invention, the multi-frequency receiver may further include a TMA so as to amplify the RF signals before the RF signals are sent, thereby reducing interference of the sending of the RF signals.

The multi-frequency receiver is described in detail with reference to FIG. 4 in the preceding embodiment. Obviously, the multi-frequency receiver may also be described with reference to FIG. 20, and specific processing procedures thereof are substantially the same as those in FIG. 4, which are not repeated herein.

Embodiment 4

Figure 9:
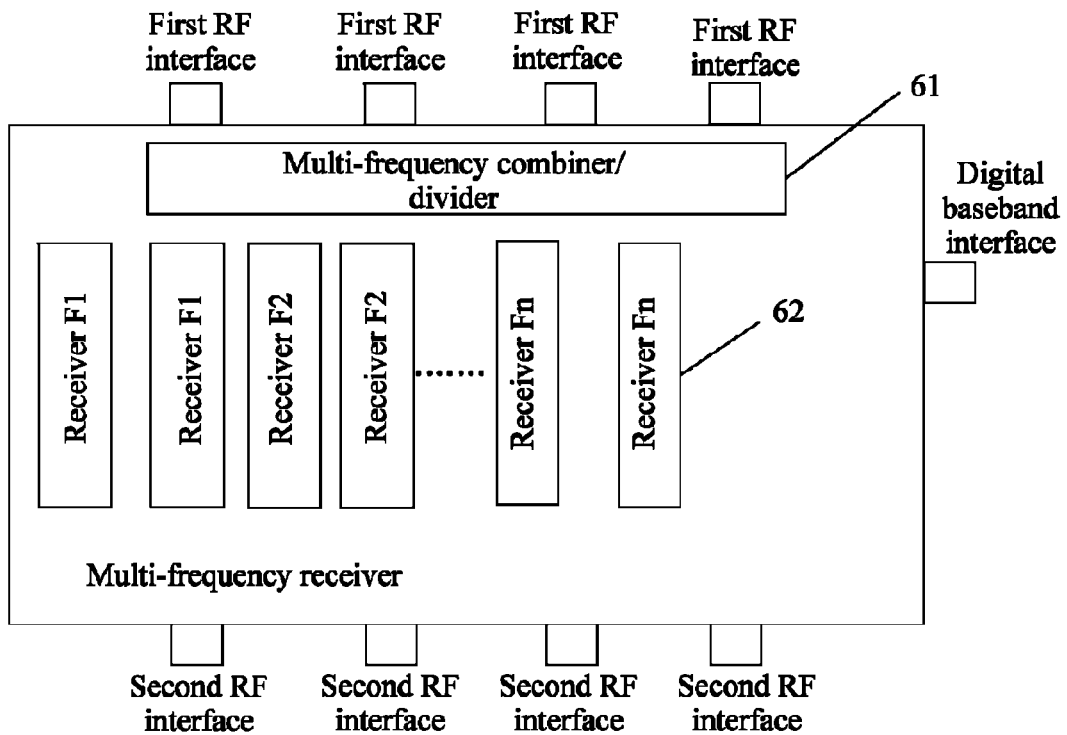
FIG. 9 is a schematic block diagram of a multi-frequency receiver according to Embodiment 4 of the present invention.

According to an embodiment of the present invention, a multi-frequency receiver is provided, and as shown in FIG. 9, the multi-frequency receiver includes a multi-frequency combiner/divider 61 and multiple receivers 62. Each frequency band corresponds to multiple receivers, one or more digital baseband interfaces, one or more first RF interfaces connected to an antenna, and one or more second RF interfaces connected to an RF unit.

The multi-frequency combiner/divider 61 is configured to distribute RF signals received by the antenna to receivers 62 of a predetermined frequency band by the frequency bands.

A first group of the receivers 62 of the predetermined frequency band is configured to send RF signals received by such receivers to the RF unit by using a second RF interface, so that the RF unit converts the received RF signals into first baseband digital signals and sends the first baseband digital signals to a baseband processing unit. A second group of the receivers 62 of the predetermined frequency band is configured to convert RF signals received by such receivers into second baseband digital signals, and to send the second baseband digital signals to the RF unit, so that the RF unit sends the second baseband digital signals to the baseband processing unit.

When the predetermined frequency band includes a first frequency band and the RF unit includes a first RF module, the first group of the receivers 62 of the predetermined frequency band is configured to send RF signals received by such receivers to the first RF unit by using a second RF interface, so that the first RF unit converts the received RF signals into the first baseband digital signals and sends the first baseband digital signals to the baseband processing unit. The second group of the receivers of the predetermined frequency band is configured to convert RF signals received by such receivers into the second baseband digital signals, and to send the second baseband digital signals to the RF unit by using a digital baseband interface, so that the RF unit sends the second baseband digital signals to the baseband processing unit. When the first frequency band includes F1, details are as follows.

Referring to FIG. 4, there are four receivers corresponding to the first frequency band F1, and two of the receivers are used as a group of the receivers of the first frequency band. The group of receivers of the first frequency band F1 is configured to send RF signals received by such receivers to the first RF module by using a second RF interface, so that the first RF module converts the received RF signals into the first baseband digital signals and sends the first baseband digital signals to the baseband processing unit. Corresponding descriptions in step 102 in Embodiment 1 may be referred to for details about how a group of the receivers of the first frequency band F1 sends the received RF signals to the first RF module by using a second RF interface. Therefore, the details are not repeated herein in other embodiments of the present invention.

Referring to FIG. 4, there are four receivers corresponding to the first frequency band F1, and the other two of the receivers are used as the remaining receivers of the first frequency band F1. The remaining receivers of the first frequency band F1 are configured to convert RF signals received by such receivers into the second baseband digital signals, and to send the second baseband digital signals to the first RF module by using a digital baseband interface, so that the first RF module sends the second baseband digital signals to the baseband processing unit.

When the predetermined frequency band includes a first frequency band and a second frequency band, and the RF unit includes a first RF module and a second RF module, the first group of the receivers 62 of the predetermined frequency band is configured to send RF signals received by such receivers to corresponding RF modules by using the second RF interfaces, so that the RF modules convert the received RF signals into the first baseband digital signals, and send the first baseband digital signals to the baseband processing unit. The second group of the receivers 62 of the predetermined frequency band is configured to convert RF signals received by such receivers into the second baseband digital signals, and to send the second baseband digital signals to the corresponding RF modules by using the digital baseband interfaces, so that the RF modules send the second baseband digital signals to the baseband processing unit. Details of the corresponding RF modules are as follows.

Referring to FIG. 4, there are four receivers corresponding to the first frequency band F1, and two of the receivers are used as a group of the receivers of the first frequency band F1; and there are four receivers corresponding to the second frequency band F2, and two of the receivers are used as a group of the receivers of the second frequency band F2. The group of the receivers of the first frequency band F1 and the group of the receivers of the second frequency band F2 are configured to send the respective received RF signals to the respective RF modules by using the respective second RF interfaces, so that the RF modules convert the received RF signals into the first baseband digital signals, and send the first baseband digital signals to the baseband processing unit. Corresponding descriptions in step 102 in Embodiment 1 may be referred to for details about how a group of the receivers of the first frequency band F1 and a group of the receivers of the second frequency band F2 send the respective received RF signals to the respective RF modules by using the respective second RF interfaces. Therefore, the details are not repeated herein in other embodiments of the present invention.

Referring to FIG. 4, there are four receivers corresponding to the first frequency band F1, and the other two of the receivers are used as the remaining receivers of the first frequency band F1; and there are four receivers corresponding to the second frequency band F2, the other two of the receivers are used as the remaining receivers of the second frequency band F2. The remaining receivers of the first frequency band F1 and the remaining receivers of the second frequency band F2 are configured to convert the respective received RF signals into the second baseband digital signals, and to send the second baseband digital signals to the corresponding RF modules by using a digital baseband interface, so that the RF modules send the second baseband digital signals to the baseband processing unit.

When the predetermined frequency band includes a first frequency band, a second frequency band, and a third frequency band, and the RF unit includes a first RF module, a second RF module, and a third RF module, the first group of the receivers of the predetermined frequency band is configured to send RF signals received by such receivers to the RF unit by using a second RF interface, so that the RF unit converts the received RF signals into the first baseband digital signals, and sends the first baseband digital signals to the baseband processing unit. The second group of the receivers of the predetermined frequency band is configured to convert RF signals received by such receivers into the second baseband digital signals, and to send the second baseband digital signals to the RF unit by using a digital baseband interface, so that the RF unit sends the second baseband digital signals to the baseband processing unit. When the first frequency band includes F1, the second frequency band includes F2, and the third frequency band includes F3, details are as follows.

Referring to FIG. 4, the number of the receivers corresponding to the first frequency band F1 is 4, and two of the receivers are used as a group of the receivers of the first frequency band F1; the number of the receivers corresponding to the second frequency band F2 is 4, and two of the receivers are used as a group of the receivers of the second frequency band F2. The group of the receivers of the first frequency band F1 and the group of receivers of the second frequency band F2 are configured to send the respective received RF signals to the respective RF modules by using the respective second RF interfaces, so that the RF modules convert the received RF signals into the first baseband digital signals, and send the first baseband digital signals to the baseband processing unit.

Referring to FIG. 4, there are four receivers corresponding to the first frequency band F1, and the other two of the receivers are used as the remaining receivers of the first frequency band F1; there are four receivers corresponding to the second frequency band F2, and the other two of the receivers are used as the remaining receivers of the second frequency band F2; and the number of the receivers corresponding to the third frequency band F3 is 4. The remaining receivers of the first frequency band F1, the remaining receivers of the second frequency band F2, and multiple receivers of the third frequency band F3 are configured to convert the respective received RF signals into the second baseband digital signals, and to send the second baseband digital signals to the corresponding RF modules by using the digital baseband interfaces, so that the RF modules send the second baseband digital signals to the baseband processing unit.

In addition, when the multi-frequency combiner/divider 61 is configured in a dividing manner, the number of the second RF interfaces is equal to that of the first RF interfaces; or when the multi-frequency combiner/divider 61 is configured in a combining manner, the number of the second RF interfaces is smaller than that of the first RF interfaces.

It should be noted that the digital baseband interface may be a CPRI, and may also be an OBSAI interface, which is not limited by the embodiments of the present invention.

In addition, the multi-frequency receiver further includes a TMA (not shown), and the TMA is configured to amplify the RF signals before the RF signals are sent to an air interface by using the multi-frequency receiver and the antenna.

In an embodiment of the present invention, the multi-frequency receiver divides RF signals by frequency bands received from an antenna to obtain the RF signals of different frequency bands; sends the first group of the RF signals of the predetermined frequency band to the RF unit so that the RF unit converts the received first group of the RF signals of the predetermined frequency band into the first baseband digital signals and sends the first baseband digital signals to the baseband processing unit; and converts the second group of the RF signals of the predetermined frequency band into the second baseband digital signals and sends the second baseband digital signals to the RF unit, to enable the RF unit to forward the second baseband digital signals to the baseband processing unit. In this way, the baseband processing unit can receive multiple channels of received signals corresponding to the different frequency bands, and the number of channels in which the network system receives the RF signals corresponding to the different frequency bands is increased without adding any antenna, thereby improving reception performance of the network system. In addition, according to an embodiment of the present invention, the baseband digital signals corresponding to the second group of the RF signals of the predetermined frequency band are sent to the baseband processing unit only by using the digital baseband interface of the multi-frequency receiver, so that multi-reception is achieved in a simple manner.

In addition, in an embodiment of the present invention, the multi-frequency receiver may further include a TMA so as to amplify the RF signals before the RF signals are sent, thereby reducing interference of the sending of the RF signals.

The multi-frequency receiver is described in detail with reference to FIG. 4 in the above embodiment. Obviously, the multi-frequency receiver may also be described with reference to FIG. 20, and specific processing procedures thereof are substantially the same as those in FIG. 4, which are not repeated herein.

Embodiment 5

Figure 10:
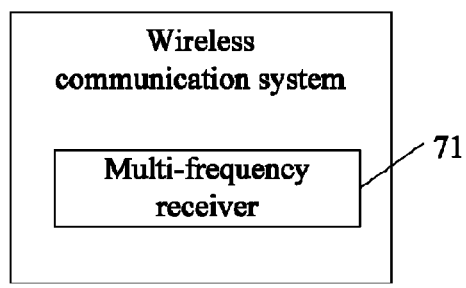
FIG. 10 is a schematic block diagram of a wireless communication system according to Embodiment 5 of the present invention.

According to an embodiment of the present invention, a wireless communication system is provided, and as shown in FIG. 10, the system includes a multi-frequency receiver 71.

The multi-frequency receiver 71 includes one or more digital baseband interfaces, one or more first RF interfaces connected to an antenna, and one or more second RF interfaces connected to an RF unit, as shown in FIG. 8 of Embodiment 3.

The multi-frequency receiver 71 is configured to divide RF signals by frequency bands received by using a first RF interface from the antenna to obtain RF signals of different frequency bands; to send a first group of RF signals of a predetermined frequency band to the RF unit by using a first RF interface so that the RF unit converts the received first group of the RF signals of the predetermined frequency band into first baseband digital signals and sends the first baseband digital signals to a baseband processing unit; and to convert the second group of the RF signals of the predetermined frequency band into second baseband digital signals and to send the second baseband digital signals to the baseband processing unit by using a digital baseband interface.

Figure 11:
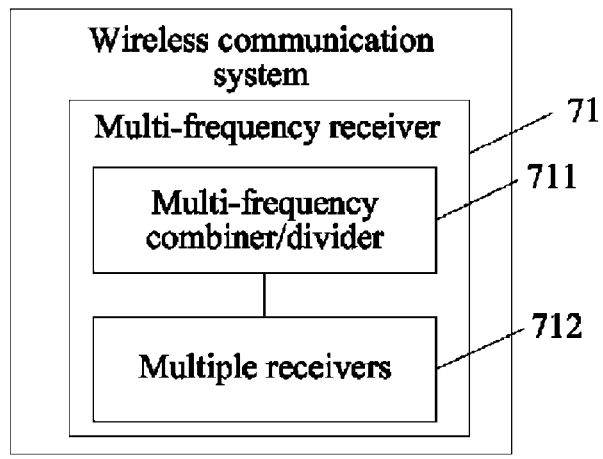
FIG. 11 is a schematic block diagram of another wireless communication system according to Embodiment 5 of the present invention.

Furthermore, as shown in FIG. 11, the multi-frequency receiver 71 further includes a multi-frequency combiner/divider 711 and receivers 712, and each frequency band corresponds to multiple receivers 712.

The multi-frequency combiner/divider 711 is configured to divide the RF signals by frequency bands received from the antenna to obtain the RF signals of different frequency bands, and to distribute the RF signals to the receivers 712 of the predetermined frequency band by the frequency bands.

A first group of the receivers 712 of the predetermined frequency band is configured to send the first group of the RF signals of the predetermined frequency band to the RF unit by using a second RF interface, so that the RF unit converts the received RF signals into the first baseband digital signals and sends the first baseband digital signals to the baseband processing unit. The second group of the receivers 712 of the predetermined frequency band is configured to convert the second group of the RF signals of the predetermined frequency band into the second baseband digital signals, and to send the second baseband digital signals to the baseband processing unit by using a digital baseband interface.

When the predetermined frequency band includes a first frequency band and the RF unit includes a first RF module, the first group of the receivers 712 of the predetermined frequency band is configured to send the first group of the RF signals of the predetermined frequency band to the RF unit by using a second RF interface so that the RF unit converts the received RF signals into the first baseband digital signals and sends the first baseband digital signals to the baseband processing unit; and the second group of the receivers 712 of the predetermined frequency band is configured to convert the second group of the RF signals of the predetermined frequency band into the second baseband digital signals and to send the second baseband digital signals to the baseband processing unit by using a digital baseband interface. Details of the corresponding RF modules are as follows.

A group of the receivers of the first frequency band is configured to send RF signals received by such receivers to the first RF module by using a second RF interface, so that the first RF module converts the received RF signals into the first baseband digital signals and sends the first baseband digital signals to the baseband processing unit.

Remaining receivers of the first frequency band are configured to convert RF signals received by such receivers into the second baseband digital signals, and to send the second baseband digital signals to the baseband processing unit by using a digital baseband interface.

When the predetermined frequency band includes a first frequency band and a second frequency band, and the RF unit includes a first RF module and a second RF module, the first group of the receivers 712 of the predetermined frequency band is configured to send the first group of the RF signals of the predetermined frequency band to the RF unit by using a second RF interface so that the RF unit converts the received RF signals into the first baseband digital signals and sends the first baseband digital signals to the baseband processing unit; and the second group of the receivers 712 of the predetermined frequency band is configured to convert the second group of the RF signals of the predetermined frequency band into the second baseband digital signals and to send the second baseband digital signals to the baseband processing unit by using a digital baseband interface. Details are as follows.

A group of the receivers of the first frequency band and a group of receivers of the second frequency band are configured to send the respective received RF signals to the respective RF modules by using the respective second RF interfaces, so that the RF modules convert the received RF signals into the first baseband digital signals and send the first baseband digital signals to the baseband processing unit.

The remaining receivers of the first frequency band and the remaining receivers of the second frequency band are configured to convert the respective received RF signals into the second baseband digital signals, and to send the second baseband digital signals to the baseband processing unit by using a digital baseband interface.

When the predetermined frequency band includes a first frequency band, a second frequency band, and a third frequency band, and the RF unit includes a first RF module, a second RF module, and a third RF module, the first group of the receivers 712 of the predetermined frequency band is configured to send the first group of the RF signals of the predetermined frequency band to the RF unit by using a second RF interface so that the RF unit converts the received RF signals into the first baseband digital signals and sends the first baseband digital signals to the baseband processing unit; and the second group of the receivers 712 of the predetermined frequency band is configured to convert the second group of the RF signals of the predetermined frequency band into the second baseband digital signals and to send the second baseband digital signals to the baseband processing unit by using a digital baseband interface. Details are as follows.

A group of the receivers of the first frequency band and a group of the receivers of the second frequency band are configured to send the respective received RF signals to the respective RF modules by using the respective second RF interfaces, so that the RF modules convert the received RF signals into the first baseband digital signals and send the first baseband digital signals to the baseband processing unit.

The remaining receivers of the first frequency band, the remaining receivers of the second frequency band, and multiple receivers of a third frequency band are configured to convert the respective received RF signals into the second baseband digital signals, and to send the second baseband digital signals to the baseband processing unit by using a digital baseband interface.

Figure 12:
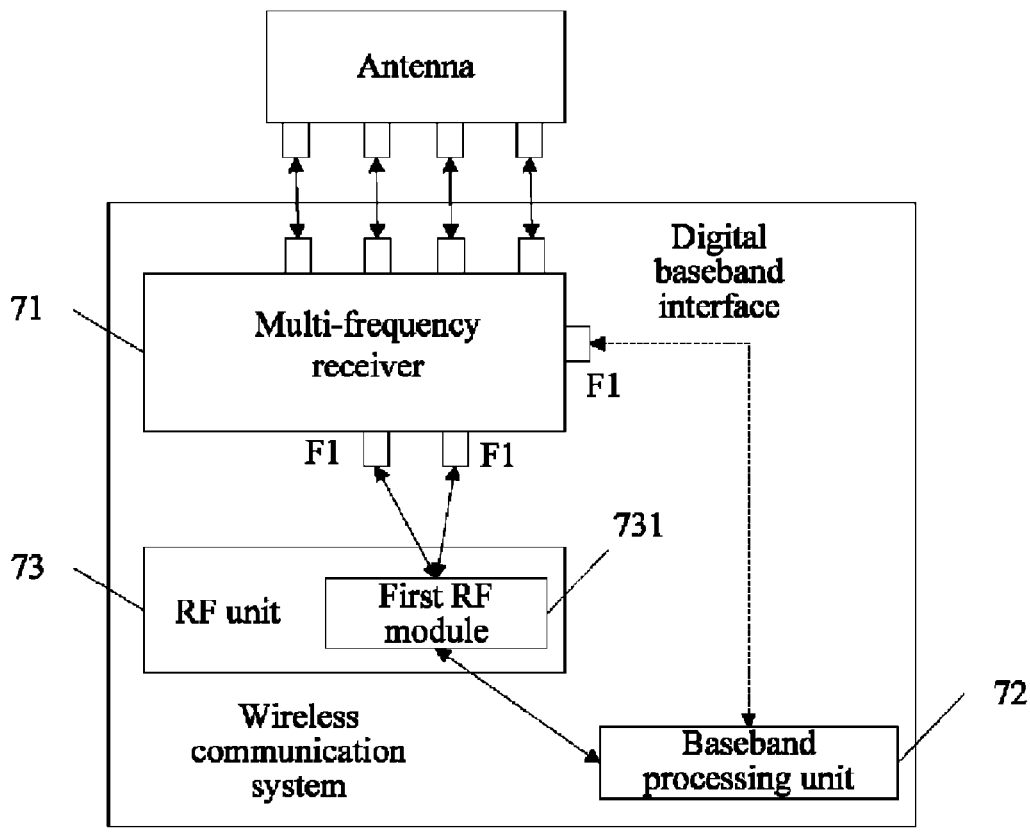
FIG. 12 is a schematic block diagram of another wireless communication system according to Embodiment 5 of the present invention.

In addition, as shown in FIG. 12, the system further includes a baseband processing unit 72 and an RF unit 73. The RF unit 73 includes a first RF module 731, and the first RF module 731 corresponds to a first frequency band F1 of the predetermined frequency band.

The first RF module 731 is configured to receive a first group of the RF signals of the first frequency band sent by the multi-frequency receiver 71, to convert the first group of the RF signals of the first frequency band into the first baseband digital signals, and to send the first baseband digital signals to the baseband processing unit 72. The baseband processing unit 72 is configured to receive the first baseband digital signals sent by the first RF module 731 and the second baseband digital signals that are obtained by converting the remaining RF signals of the first frequency band and sent by the multi-frequency receiver 71 by using a digital baseband interface, and to perform baseband processing on the first baseband digital signals and the second baseband digital signals.

Figure 13:
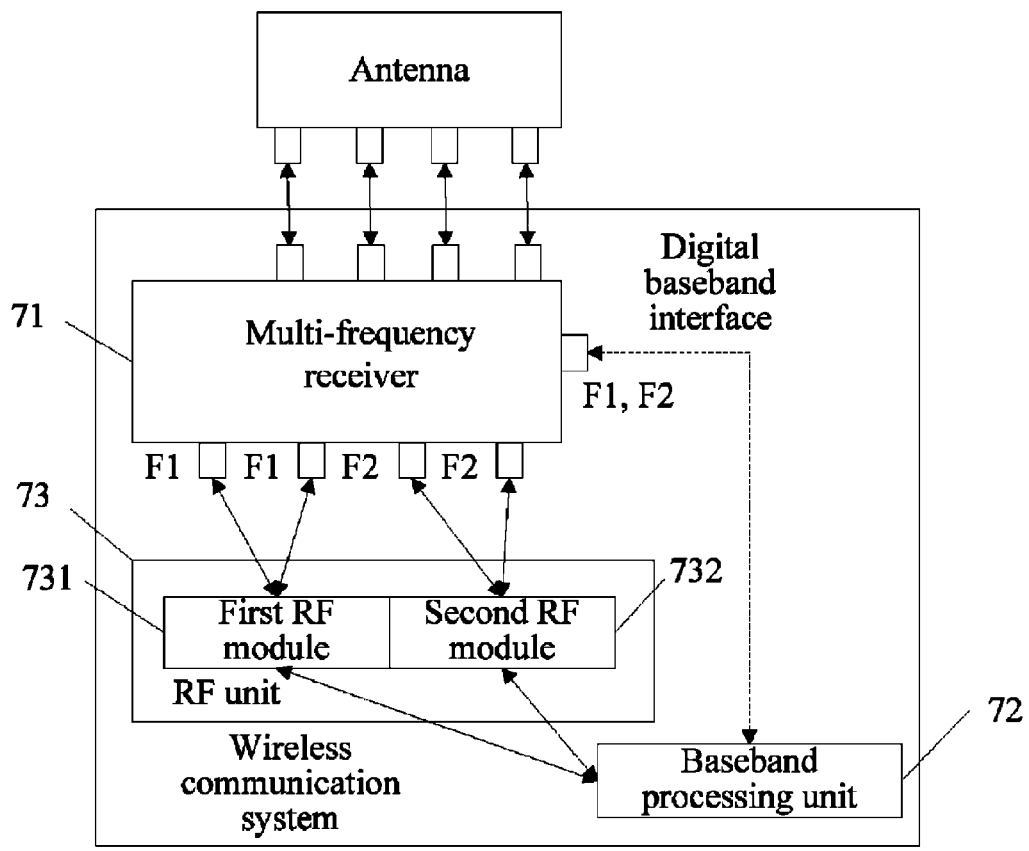
FIG. 13 is a schematic block diagram of another wireless communication system according to Embodiment 5 of the present invention.

Furthermore, as shown in FIG. 13, the RF unit 73 of the system further includes a second RF module 732. The second RF module 732 corresponds to a second frequency band F2 of the predetermined frequency band.

The second RF module 732 is configured to receive a first group of the RF signals of the second frequency band sent by the multi-frequency receiver 71, to convert the received first group of the RF signals of the second frequency band into the first baseband digital signals, and to send the first baseband digital signals to the baseband processing unit 72.

The baseband processing unit 72 is configured to receive the first baseband digital signals sent by the second RF module 732 and the second baseband digital signals that are obtained by converting the remaining RF signals of the second frequency band and sent by the multi-frequency receiver 71 by using a digital baseband interface, and to perform the baseband processing on the first baseband digital signals and the second baseband digital signals.

Figure 14:
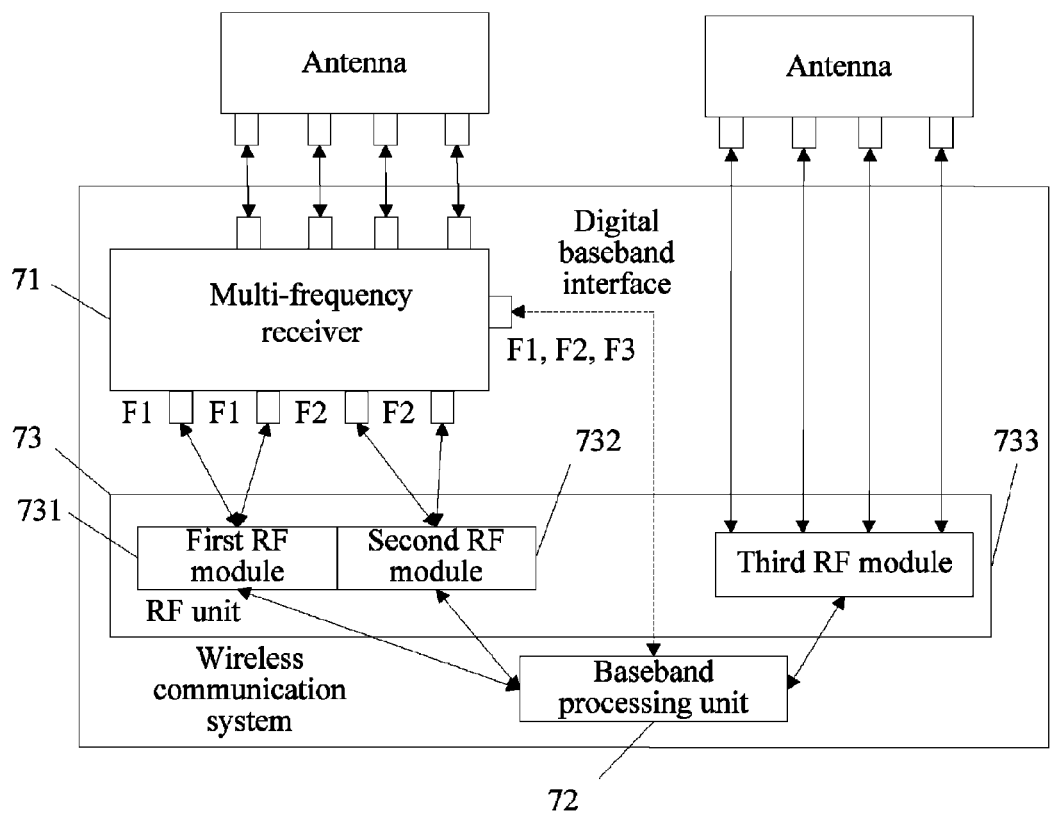
FIG. 14 is a schematic block diagram of another wireless communication system according to Embodiment 5 of the present invention.

Furthermore, as shown in FIG. 14, the RF unit 73 further includes a third RF module 733. The third RF module 733 corresponds to a third frequency band F3 of the predetermined frequency band.

The third RF module 733 is configured to receive RF signals of the third frequency band from another antenna, to convert the RF signals of the third frequency band from the antenna into the third baseband digital signals, and to send the third baseband digital signals to the baseband processing unit 72.

The baseband processing unit 72 is further configured to receive the third baseband digital signals sent by the third RF module 733 and the second baseband digital signals that are obtained by converting the remaining RF signals of the third frequency band and sent by the multi-frequency receiver 71 by using a digital baseband interface, and to perform the baseband processing on the first baseband digital signals and the second baseband digital signals.

It should be noted that the digital baseband interface may be a CPRI, which is not limited by the embodiments of the present invention, and may also be an OBSAI interface.

In addition, the multi-frequency receiver 71 may be mounted at the top of an outdoor tower or indoors, which is not limited by the embodiments of the present invention, and a user can make a choice according to specific conditions.

Corresponding descriptions in Embodiment 1 and Embodiment 3 may be referred to for other descriptions of the corresponding functional modules in the embodiments of the present invention. Therefore, they are not repeated herein in other embodiments of the present invention.

In an embodiment of the present invention, the multi-frequency receiver divides the RF signals by frequency bands received from an antenna to obtain the RF signals of the different frequency bands; sends the first group of the RF signals of the predetermined frequency band to the RF unit so that the RF unit converts the received first group of the RF signals of the predetermined frequency band into the first baseband digital signals and sends the first baseband digital signals to the baseband processing unit; and converts the second group of the RF signals of the predetermined frequency band into the second baseband digital signals and sends the second baseband digital signals to the baseband processing unit. In this way, the baseband processing unit can receive multiple channels of received signals corresponding to the different frequency bands, and the number of channels in which the network system receives the RF signals corresponding to the different frequency bands is increased without adding any antenna, thereby improving reception performance of the network system. In addition, in the technical solution according to an embodiment of the present invention, the baseband digital signals corresponding to the second group of the RF signals of the predetermined frequency band are sent to the baseband processing unit only by using the digital baseband interface of the multi-frequency receiver, so that multi-reception is achieved in a simple manner.

In addition, in an embodiment of the present invention, the multi-frequency receiver may further include a TMA so as to amplify the RF signals before the RF signals are sent, thereby reducing interference of the sending of the RF signals.

Embodiment 6

Figure 15:
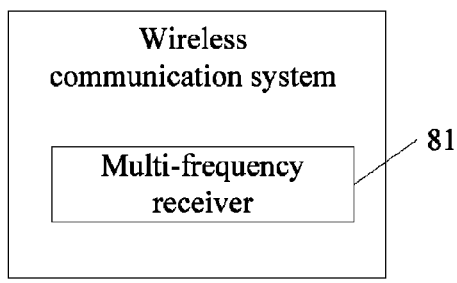
FIG. 15 is a schematic block diagram of a wireless communication system according to Embodiment 6 of the present invention.

According to an embodiment of the present invention, a wireless communication system is provided, and as shown in FIG. 15, the system includes a multi-frequency receiver 81.

The multi-frequency receiver 81 includes one or more digital baseband interfaces, one or more first RF interfaces connected to an antenna, and one or more second RF interfaces connected to an RF unit.

The multi-frequency receiver 81 is configured to divide RF signals by frequency bands received by using a first RF interface from the antenna to obtain RF signals of different frequency bands; to send a first group of RF signals of a predetermined frequency band to the RF unit by using a second RF interface so that the RF unit converts the received first group of the RF signals of the predetermined frequency band into first baseband digital signals and sends the first baseband digital signals to a baseband processing unit; and to convert a second group of the RF signals of the predetermined frequency band into second baseband digital signals and to send the second baseband digital signals to a first RF module by using a digital baseband interface, so that the first RF module sends the second baseband digital signals to the baseband processing unit.

Figure 16:
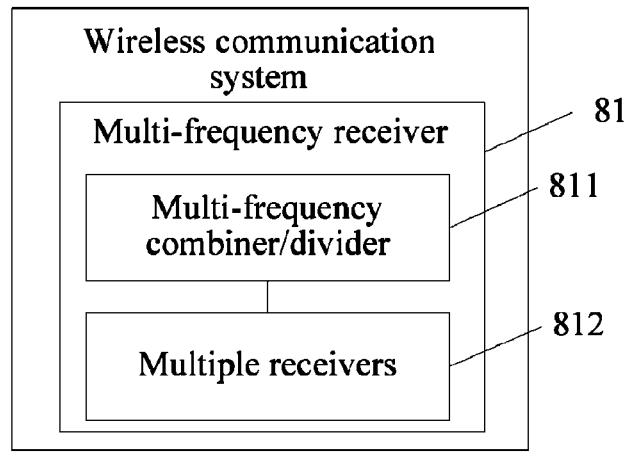
FIG. 16 is a schematic block diagram of another wireless communication system according to Embodiment 6 of the present invention.

Furthermore, as shown in FIG. 16, the multi-frequency receiver 81 further includes a multi-frequency combiner/divider 811 and receivers 812, and each frequency band corresponds to multiple receivers 812.

The multi-frequency combiner/divider 811 is configured to divide RF signals by frequency bands received from the antenna to obtain the RF signals of different frequency bands, to distribute the RF signals to the receivers 811 of the predetermined frequency band by the frequency bands.

A first group of the receivers 812 of the predetermined frequency band is configured to send the first group of the RF signals of the predetermined frequency band to the RF unit by using a second RF interface, so that the RF unit converts the received RF signals into the first baseband digital signals and sends the first baseband digital signals to the baseband processing unit.

A second group of the receivers 812 of the predetermined frequency band is configured to convert the second group of the RF signals of the predetermined frequency band into the second baseband digital signals, and to send the second baseband digital signals to the RF unit by using a digital baseband interface, so that the RF unit sends the second baseband digital signals to the baseband processing unit.

When the predetermined frequency band includes a first frequency band and the RF unit includes a first RF module, the first group of the receivers 812 of the predetermined frequency band is configured to send the first group of the RF signals of the predetermined frequency band to the RF unit by using a second RF interface so that the RF unit converts the received RF signals into the first baseband digital signals and sends the first baseband digital signals to the baseband processing unit; and the second group of the receivers 812 of the predetermined frequency band is configured to convert the second group of the RF signals of the predetermined frequency band into the second baseband digital signals and to send the second baseband digital signals to the RF unit by using a digital baseband interface so that the RF unit sends the second baseband digital signals to the baseband processing unit. Details are as follows.

A group of the receivers of the first frequency band is configured to send the received RF signals to the first RF module by using a second RF interface, so that the first RF module converts the received RF signals into the first baseband digital signals and sends the first baseband digital signals to the baseband processing unit.

Remaining receivers of the first frequency band are configured to convert RF signals received by such receivers into the second baseband digital signals, and to send the second baseband digital signals to the first RF module by using a digital baseband interface, so that the first RF module sends the second baseband digital signals to the baseband processing unit.

When the predetermined frequency band includes a first frequency band and a second frequency band, and the RF unit includes a first RF module and a second RF module, the first group of the receivers 812 of the predetermined frequency band is configured to send the first group of the RF signals of the predetermined frequency band to the RF unit by using a second RF interface so that the RF unit converts the received RF signals into the first baseband digital signals and sends the first baseband digital signals to the baseband processing unit; and the second group of the receivers 812 of the predetermined frequency band is configured to convert the second group of the RF signals of the predetermined frequency band into the second baseband digital signals and to send the second baseband digital signals to the RF unit by using a digital baseband interface so that the RF unit sends the second baseband digital signals to the baseband processing unit. Details are as follows.

A group of the receivers of the first frequency band and a group of the receivers of the second frequency band are configured to send the respective received RF signals to the respective RF modules by using the respective second RF interfaces, so that the RF modules convert the received RF signals into the first baseband digital signals and send the first baseband digital signals to the baseband processing unit.

The remaining receivers of the first frequency band and the remaining receivers of the second frequency band are configured to convert the respective received RF signals into the second baseband digital signals, and to send the second baseband digital signals to the corresponding RF modules by using a digital baseband interface, so that the RF modules send the second baseband digital signals to the baseband processing unit.

When the corresponding frequency band includes a first frequency band, a second frequency band, and a third frequency band, and the RF unit includes a first RF module, a second RF module, and a third RF module, the first group of the receivers 812 of the predetermined frequency band is configured to send the first group of the RF signals of the predetermined frequency band to the RF unit by using a second RF interface so that the RF unit converts the received RF signals into the first baseband digital signals and sends the first baseband digital signals to the baseband processing unit; and the second group of the receivers 812 of the predetermined frequency band is configured to convert the second group of the RF signals of the predetermined frequency band into the second baseband digital signals and to send the second baseband digital signals to the RF unit by using a digital baseband interface so that the RF unit sends the second baseband digital signals to the baseband processing unit. Details are as follows.

A group of the receivers of the first frequency band and a group of the receivers of the second frequency band are configured to send the respective received RF signals to the respective RF modules by using the respective second RF interfaces, so that the RF modules convert the received RF signals into the first baseband digital signals and send the first baseband digital signals to the baseband processing unit.

The remaining receivers of the first frequency band and the remaining receivers of the second frequency band are configured to convert the respective received RF signals into the second baseband digital signals, and to send the second baseband digital signals to the corresponding RF modules by using a digital baseband interface, so that the RF modules send the second baseband digital signals to the baseband processing unit.

Multiple receivers of the third frequency band are configured to convert RF signals received by such receivers into the second baseband digital signals, and to send the second baseband digital signals to the third RF module by using a digital baseband interface, so that the third RF module sends the second baseband digital signals to the baseband processing unit.

Figure 17:
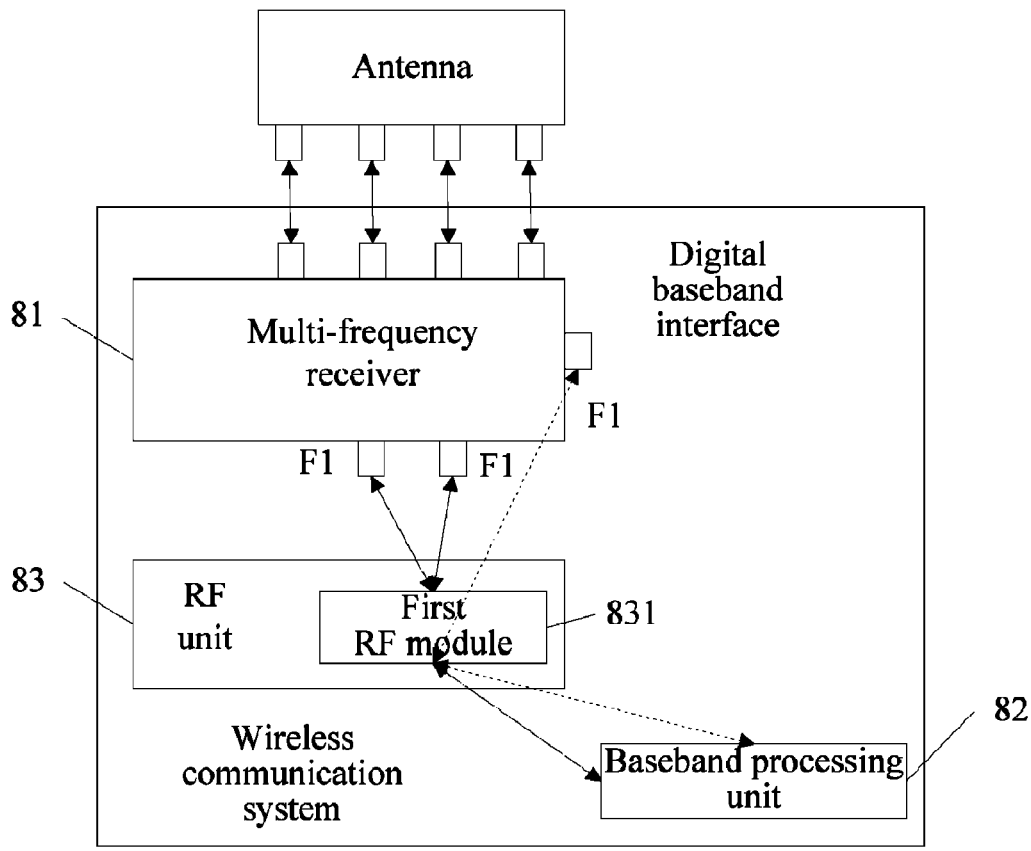
FIG. 17 is a schematic block diagram of another wireless communication system according to Embodiment 6 of the present invention.

In addition, as shown in FIG. 17, the system further includes a baseband processing unit 82 and an RF unit 83. The RF unit 83 includes a first RF module 831, and the first RF module 831 corresponds to a first frequency band F1 of the predetermined frequency band.

The first RF module 831 is configured to receive a first group of the RF signals of the first frequency band sent by the multi-frequency receiver 81, to convert the first group of the RF signals of the first frequency band into the first baseband digital signals, to send the first baseband digital signals to the baseband processing unit 82; and to receive the second baseband digital signals that are obtained by converting the remaining RF signals of the first frequency band and sent by the multi-frequency receiver 81 by using a digital baseband interface, and to send the second baseband digital signals to the baseband processing unit 82.

The baseband processing unit 82 is configured to receive the first baseband digital signals and the second baseband digital signals sent by the first RF module 831, and to perform baseband processing on the first baseband digital signals and the second baseband digital signals.

Figure 18:
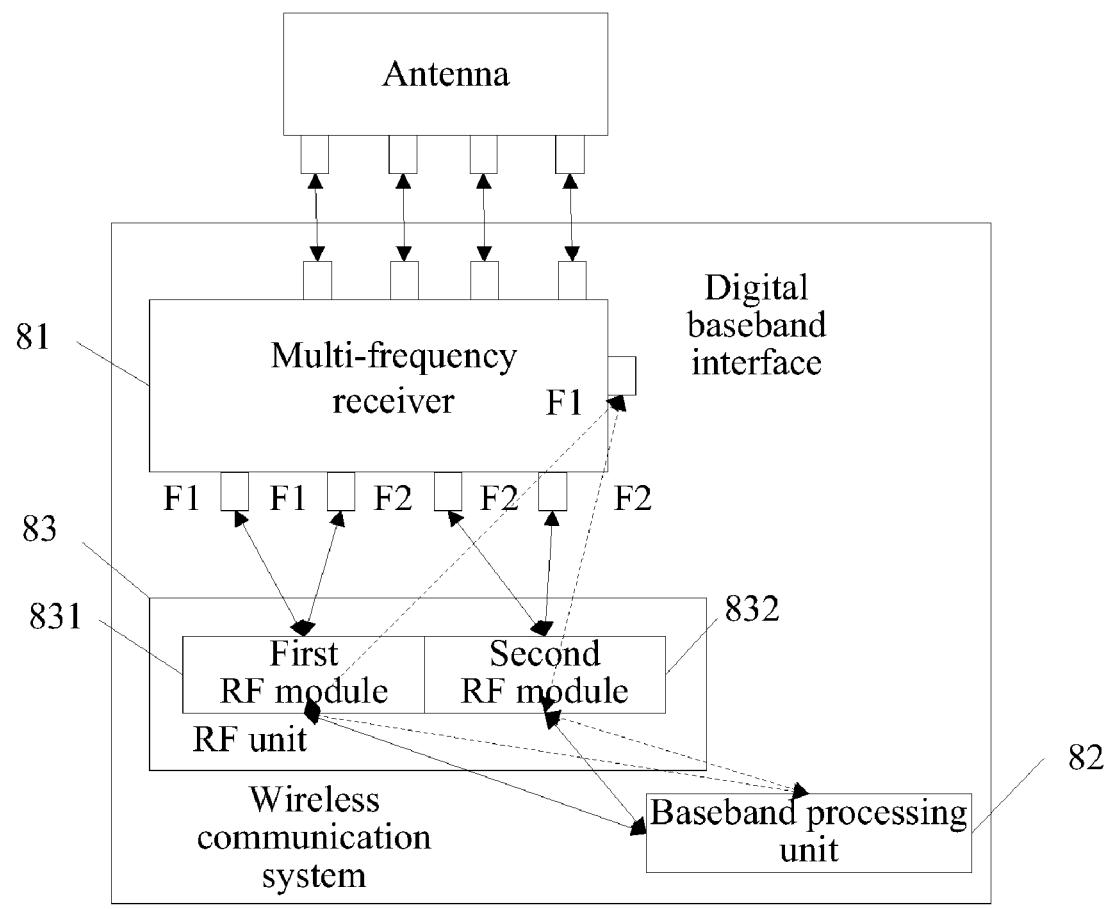
FIG. 18 is a schematic block diagram of another wireless communication system according to Embodiment 6 of the present invention.

Furthermore, as shown in FIG. 18, the RF unit 83 further includes a second RF module 832. The second RF module 832 corresponds to a second frequency band F2 of the predetermined frequency band.

The second RF module 832 is configured to receive a first group of the RF signals of the second frequency band sent by the multi-frequency receiver 81, to convert the first group of the RF signals of the second frequency band into the first baseband digital signals, and to send the first baseband digital signals to the baseband processing unit 82; and to receive the second baseband digital signals that are obtained by converting the remaining RF signals of the second frequency band and sent by the multi-frequency receiver 81 by using a digital baseband interface, and to send the second baseband digital signals to the baseband processing unit 82.

The baseband processing unit 82 is further configured to receive the first baseband digital signals and the second baseband digital signals sent by the second RF module 832, and to perform the baseband processing on the first baseband digital signals and the second baseband digital signals.

Figure 19:
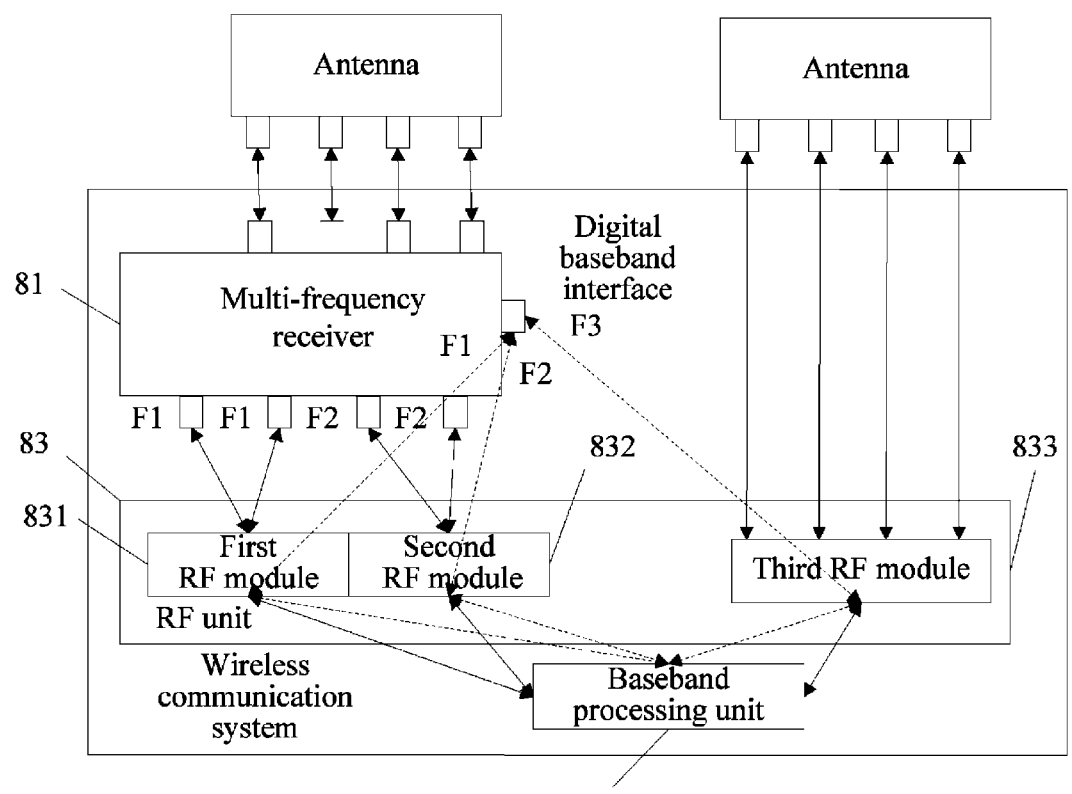
FIG. 19 is a schematic block diagram of another wireless communication system according to Embodiment 6 of the present invention.

Furthermore, as shown in FIG. 19, the RF unit 83 further includes a third RF module 833. The third RF module 833 corresponds to a third frequency band F3 of the predetermined frequency band.

The third RF module 833 is configured to receive the second baseband digital signals that are obtained by converting the RF signals of the third frequency band and sent by the multi-frequency receiver 81 by using a digital baseband interface, and to send the second baseband digital signals to the baseband processing unit 82; and to receive RF signals of the third frequency band from another antenna, to convert the RF signals of the third frequency band from the antenna into third baseband digital signals, and to send the third baseband digital signals to the baseband processing unit 82.

The baseband processing unit 82 is further configured to receive the second baseband digital signals and the third baseband digital signals sent by the third RF module 833, and to perform the baseband processing on the second baseband digital signals and the third baseband digital signals.

It should be noted that the digital baseband interface may be a CPRI, which is not limited by the embodiments of the present invention, and may also be an OBSAI interface.

In addition, the multi-frequency receiver 81 may be mounted at the top of an outdoor tower or indoors, which is not limited by the embodiments of the present invention, and a user can make a choice according to specific conditions.

It should be noted that the baseband processing unit 82 and the RF unit 83 may be separate functional modules, and the baseband processing unit 82 may also be integrated into the RF unit 83, which is not limited by the embodiments of the present invention and can be disposed specifically according to requirements of the user.

Corresponding descriptions in Embodiment 2 and Embodiment 4 may be referred to for other descriptions of the corresponding functional modules in the embodiments of the present invention. Therefore, they are not repeated herein in other embodiments of the present invention.

In an embodiment of the present invention, the multi-frequency receiver divides RF signals by frequency bands received from the antenna to obtain the RF signals of different frequency bands; sends the first group of the RF signals of the predetermined frequency band to the RF unit so that the RF unit converts the received first group of the RF signals of the predetermined frequency band into the first baseband digital signals and sends the first baseband digital signals to the baseband processing unit; and converts the second group of the RF signals of the predetermined frequency band into the second baseband digital signals and sends the second baseband digital signals to the RF unit, to enable the RF unit to forward the second baseband digital signals to the baseband processing unit. In this way, the baseband processing unit can receive multiple channels of received signals corresponding to the different frequency bands, and the number of channels in which the network system receives the RF signals of the different frequency bands is increased without adding any antenna, thereby improving reception performance of the network system. In addition, in the technical solution according to an embodiment of the present invention, the baseband digital signals corresponding to the second group of the RF signals of the predetermined frequency band are sent to the baseband processing unit only by using the digital baseband interface of the multi-frequency receiver, so that multi-reception is achieved in a simple manner.

In addition, in an embodiment of the present invention, the multi-frequency receiver may further include a TMA so as to amplify the RF signals before the RF signals are sent, thereby reducing interference of the sending of the RF signals.

It should be noted that embodiments corresponding to FIG. 12 and FIG. 17 may be implemented separately or in a combined manner. When implemented in a combined manner, specifically which link manner of the digital baseband interface is to be used is determined according to a choice of a user. Corresponding descriptions in FIG. 12 and FIG. 17 may be referred to for detailed descriptions of, for example, the sending, by the multi-frequency receiver, the first group of the RF signals of the predetermined frequency band (such as the first frequency band F1) to the RF unit (such as the first RF module) by using a first RF interface; converting the second group of the RF signals of the predetermined frequency band into the second baseband digital signals, and sending the second baseband digital signals to the baseband processing unit by using a digital baseband interface; and converting a third group of the RF signals into third baseband digital signals, and sending the third baseband digital signals to the RF unit by using a digital baseband interface. Therefore, they are not repeated herein in other embodiments of the present invention. Furthermore, embodiments corresponding to FIG. 13 and FIG. 18 may be implemented separately or in a combined manner. When implemented in the combined manner, specifically which link manner of the digital baseband interface is to be used is determined according to a choice of a user. Corresponding descriptions in FIG. 13 and FIG. 18 may be referred to for detailed descriptions, which are not repeated herein in other embodiments of the present invention. Furthermore, embodiments corresponding to FIG. 14 and FIG. 19 may be implemented separately or in a combined manner.

When implemented in the combined manner, specifically which link manner of the digital baseband interface is to be used is determined according to a choice of a user. Corresponding descriptions in FIG. 14 and FIG. 19 may be referred to for detailed descriptions, which are not repeated herein in other embodiments of the present invention.

Through the above description of the embodiments, it is apparent to persons skilled in the art that the present invention may be accomplished by software plus necessary universal hardware, and definitely may also be accomplished by hardware, but in most cases, the present invention is preferably implemented by using the former method. Based on this, the technical solution of the present invention or the part that makes contributions to the prior art can be substantially embodied in the form of a software product. The computer software product may be stored in the readable storage media, for example, a floppy disk, hard disk, or optical disk of the computer, and contain several instructions adapted to instruct computer equipment (for example, a personal computer, a server, or network equipment) to perform the method according to the embodiments of the present invention.

In conclusion, the above are merely exemplary embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A multi-frequency receiver, comprising:
 a multi-frequency combiner/divider;
 multiple receivers, wherein each frequency band of a plurality of frequency bands corresponds to ones of the multiple receivers and wherein receivers of a predetermined frequency band include a first group of receivers and a second group of receivers;
 one or more digital baseband interfaces;
 one or more first Radio Frequency (RF) interfaces configured to be connected to an antenna; and
 one or more second RF interfaces configured to be connected to an RF unit;
 wherein the multi-frequency combiner/divider is configured to distribute RF signals received from the antenna to the receivers of the predetermined frequency band based on the frequency bands;
 wherein the RF signals received from the antenna comprise multiple RF signals of different frequency bands;
 wherein the multi-frequency combiner/divider comprises multiple filters of the predetermined frequency band, the multiple filters configured to filter out RF signals of the predetermined frequency band from the RF signals received from the antenna;
 wherein the first group of receivers is configured to receive a first group of the RF signals of the predetermined frequency band and to send the first group of the RF signals to the RF unit via a second RF interface so that the RF unit converts the first group of the RF signals into first baseband digital signals and sends the first baseband digital signals to a baseband processing unit; and
 wherein the second group of receivers is configured to receive a second group of the RF signals of the predetermined frequency band, to convert the second group of the RF signals into second baseband digital signals, and to send the second baseband digital signals to the baseband processing unit via a digital baseband interface of the one or more digital baseband interfaces so that the first baseband digital signals and the second baseband digital signals, corresponding to the predetermined frequency band, are received by the baseband processing unit.

2. The multi-frequency receiver according to claim 1, wherein the predetermined frequency band comprises a first frequency band and wherein the RF unit comprises a first RF module;
wherein a group of receivers of the first frequency band is configured to send RF signals received by the group of receivers to the first RF module by using a second RF interface so that the first RF module converts the received RF signals into the first baseband digital signals and sends the first baseband digital signals to the baseband processing unit; and
wherein remaining receivers of the first frequency band are configured to convert RF signals received by the remaining receivers into the second baseband digital signals, and to send the second baseband digital signals to the baseband processing unit via a digital baseband interface of the one or more digital baseband interfaces.

3. The multi-frequency receiver according to claim 1, wherein the predetermined frequency band comprises a first frequency band and a second frequency band, and wherein the RF unit comprises a first RF module and a second RF module;
wherein a group of receivers of the first frequency band and a group of receivers of the second frequency band are configured to send respective received RF signals to respective RF modules by using respective second RF interfaces so that the RF modules convert the received RF signals into the first baseband digital signals and send the first baseband digital signals to the baseband processing unit; and
wherein remaining receivers of the first frequency band and remaining receivers of the second frequency band are configured to convert respective received RF signals into the second baseband digital signals, and to send the second baseband digital signals to the baseband processing unit via a digital baseband interface of the one or more digital baseband interfaces.

4. The multi-frequency receiver according to claim 1, wherein the predetermined frequency band comprises a first frequency band, a second frequency band, and a third frequency band, and wherein the RF unit comprises a first RF module, a second RF module, and a third RF module;
wherein a group of receivers of the first frequency band and a group of receivers of the second frequency band are configured to send respective received RF signals to respective RF modules via respective second RF interfaces so that the RF modules convert the received RF signals into the first baseband digital signals and send the first baseband digital signals to the baseband processing unit; and
wherein remaining receivers of the first frequency band, remaining receivers of the second frequency band, and multiple receivers of the third frequency band are configured to convert respective received RF signals into the second baseband digital signals, and to send the second baseband digital signals to the baseband processing unit via a digital baseband interface of the one or more digital baseband interfaces.

5. The multi-frequency receiver according to claim 1, wherein,
when the multi-frequency combiner/divider is configured in a dividing manner, the number of the second RF interfaces is equal to the number of the first RF interfaces.

6. The multi-frequency receiver according to claim 1, wherein,
when the multi-frequency combiner/divider is configured in a combining manner, the number of the second RF interfaces is smaller than the number of the first RF interfaces.

7. The multi-frequency receiver according to claim 1, wherein each digital baseband interface is a Common Public Radio Interface (CPRI).

8. The multi-frequency receiver according to claim 1, wherein the multi-frequency receiver further comprises a Tower Mounted Amplifier (TMA), and the TMA is configured to amplify the RF signals before the RF signals are sent to an air interface by using the multi-frequency receiver and the antenna.

9. A wireless communication system, comprising:
a multi-frequency receiver;
wherein the multi-frequency receiver comprises one or more digital baseband interfaces, one or more first Radio Frequency (RF) interfaces connected to an antenna, and one or more second RF interfaces connected to an RF unit;
wherein the multi-frequency receiver is configured to divide, based on frequency bands, RF signals received from the antenna via a first RF interface to obtain RF signals of different frequency bands;
wherein the multi-frequency receiver comprises multiple filters of a predetermined frequency band, the multiple filters configured to filter out RF signals of the predetermined frequency band from the RF signals received from the antenna;
wherein the multi-frequency receiver is further configured to send a first group of the RF signals of the predetermined frequency band to the RF unit via a second RF interface so that the RF unit converts the first group of the RF signals of the predetermined frequency band into first baseband digital signals and sends the first baseband digital signals to a baseband processing unit; and
wherein the multi-frequency receiver is further configured to convert a second group of the RF signals of the predetermined frequency band into second baseband digital signals and to send the second baseband digital signals to the baseband processing unit via a digital baseband interface of the one or more digital baseband interfaces so that the first baseband digital signals and the second baseband digital signals, corresponding to the predetermined frequency band, are received by the baseband processing unit.

10. The system according to claim 9, wherein the multi-frequency receiver further comprises a multi-frequency combiner/divider and receivers, and wherein each frequency band corresponds to multiple receivers;
wherein the multi-frequency combiner/divider is configured to divide, based on the frequency bands, the RF signals received from the antenna to obtain the RF signals of the different frequency bands, and to distribute the RF signals of the different frequency bands to the receivers based on the frequency bands;
wherein a first group of the receivers of the predetermined frequency band is configured to send the first group of the RF signals of the predetermined frequency band to the RF unit by using one of the one or more second RF interfaces so that the RF unit converts the received RF signals into the first baseband digital signals and sends the first baseband digital signals to the baseband processing unit; and wherein a second group of the receivers of the predetermined frequency band is configured to convert the second group of the RF signals of the predetermined frequency band into the second baseband digital signals, and to send the second baseband digital signals to the baseband processing unit by using a digital baseband interface of the one or more digital baseband interfaces.

11. The system according to claim 10, wherein the predetermined frequency band comprises a first frequency band and the RF unit comprises a first RF module;

wherein a group of receivers of the first frequency band is configured to send RF signals received by the group of receivers to the first RF module via a second RF interface so that the first RF module converts the received RF signals into the first baseband digital signals and sends the first baseband digital signals to the baseband processing unit; and wherein remaining receivers of the first frequency band are configured to convert RF signals received by the remaining receivers into the second baseband digital signals, and to send the second baseband digital signals to the baseband processing unit via a digital baseband interface of the one or more digital baseband interfaces.

12. The system according to claim 10, wherein the predetermined frequency band comprises a first frequency band and a second frequency band, and wherein the RF unit comprises a first RF module and a second RF module;

wherein a group of receivers of the first frequency band and a group of receivers of the second frequency band are configured to send respective received RF signals to respective RF modules via respective second RF interfaces so that the RF modules convert the received RF signals into the first baseband digital signals and send the first baseband digital signals to the baseband processing unit; and wherein remaining receivers of the first frequency band and remaining receivers of the second frequency band are configured to convert respective received RF signals into the second baseband digital signals, and to send the second baseband digital signals to the baseband processing unit via a digital baseband interface of the one or more digital baseband interfaces.

13. The system according to claim 10, wherein the predetermined frequency band comprises a first frequency band, a second frequency band, and a third frequency band, and wherein the RF unit comprises a first RF module, a second RF module, and a third RF module;

wherein a group of receivers of the first frequency band and a group of receivers of the second frequency band are configured to send respective received RF signals to respective RF modules via respective second RF interfaces so that the RF modules convert the received RF signals into the first baseband digital signals and send the first baseband digital signals to the baseband processing unit; and wherein remaining receivers of the first frequency band, remaining receivers of the second frequency band, and multiple receivers of the third frequency band are configured to convert respective received RF signals into the second baseband digital signals, and to send the second baseband digital signals to the baseband processing unit via a digital baseband interface of the one or more digital baseband interfaces.

14. The system according to claim 9, further comprising the baseband processing unit, wherein the RF unit comprises a first RF module and the first RF module corresponds to a first frequency band of the predetermined frequency band;

wherein the first RF module is configured to receive a first group of the RF signals of the first frequency band sent by the multi-frequency receiver, to convert the first group of the RF signals of the first frequency band into the first baseband digital signals, and to send the first baseband digital signals to the baseband processing unit; and wherein the baseband processing unit is configured to receive the first baseband digital signals sent by the first RF module and the second baseband digital signals that are obtained by converting remaining RF signals of the first frequency band and sent by the multi-frequency receiver via a digital baseband interface of the one or more digital baseband interfaces, and to perform baseband processing on the first baseband digital signals and the second baseband digital signals.

15. The system according to claim 14, wherein the RF unit further comprises a second RF module, wherein the second RF module corresponds to a second frequency band of the predetermined frequency band;

wherein the second RF module is configured to receive a first group of the RF signals of the second frequency band sent by the multi-frequency receiver, to convert the first group of the RF signals of the second frequency band into the first baseband digital signals, and to send the first baseband digital signals to the baseband processing unit; and wherein the baseband processing unit is configured to receive the first baseband digital signals sent by the second RF module and second baseband digital signals that are obtained by converting remaining RF signals of the second frequency band and sent by the multi-frequency receiver via a digital baseband interface of the one or more digital baseband interfaces, and perform the baseband processing on the first baseband digital signals and the second baseband digital signals.

16. The system according to claim 14, wherein the RF unit further comprises a third RF module, wherein the third RF module corresponds to a third frequency band of the predetermined frequency band;

wherein the third RF module is configured to receive RF signals of the third frequency band from another antenna, to convert the RF signals of the third frequency band into third baseband digital signals, and to send the third baseband digital signals to the baseband processing unit; and wherein the baseband processing unit is further configured to receive the third baseband digital signals sent by the third RF module and second baseband digital signals that are obtained by converting remaining RF signals of the third frequency band and sent by the multi-frequency receiver via a digital baseband interface of the one or more digital baseband interfaces, and to perform the baseband processing on the first baseband digital signals and the second baseband digital signals.

17. The system according to claim 9, wherein each digital baseband interface is a Common Public Radio Interface (CPRI).

* * * * *